United States Patent
Hayes et al.

(10) Patent No.: US 11,924,186 B2
(45) Date of Patent: Mar. 5, 2024

(54) WIRELESS PEER TO PEER MOBILE WALLET CONNECTIONS

(71) Applicant: Wells Fargo Bank, N.A., San Francisco, CA (US)

(72) Inventors: Thomas Hayes, Katy, TX (US); Joon Maeng, Newcastle, WA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/185,552

(22) Filed: Mar. 17, 2023

(65) Prior Publication Data

US 2023/0239281 A1    Jul. 27, 2023

Related U.S. Application Data

(63) Continuation of application No. 17/645,928, filed on Dec. 23, 2021, now Pat. No. 11,611,543, which is a
(Continued)

(51) Int. Cl.
*H04L 29/06* (2006.01)
*G06Q 20/22* (2012.01)
(Continued)

(52) U.S. Cl.
CPC ......... *H04L 63/061* (2013.01); *G06Q 20/223* (2013.01); *G06Q 20/327* (2013.01);
(Continued)

(58) Field of Classification Search
None
See application file for complete search history.

(56) References Cited

U.S. PATENT DOCUMENTS

| 4,893,338 A | 1/1990 | Pastor |
| 5,535,276 A | 7/1996 | Ganesan |

(Continued)

FOREIGN PATENT DOCUMENTS

| CA | 2853146 A1 | 1/2016 |
| CN | 102693378 A | 9/2012 |

OTHER PUBLICATIONS

US 10,498,713 B1, 12/2019, Hayes et al. (withdrawn)
(Continued)

*Primary Examiner* — Bradley W Holder
(74) *Attorney, Agent, or Firm* — SCHWEGMAN LUNDBERG & WOESSNER, P.A.

(57) ABSTRACT

Disclosed in some examples are devices, systems, and machine readable mediums for establishing peer to peer mobile wallet communications (P2PMW) over short range wireless communication networks. These P2PMW communications allow exchange of information between two wallet clients. Example communications include payments, providing identification, providing loans, and the like. The use of P2PMW communications opens up the prospect of anyone accepting payment from anybody else at any time. All that is needed is a computing device with a mobile wallet. Example short range wireless communications include Wireless LANs (WLAN) such as WIFI (e.g., communicating according to an Institute for Electrical and Electronics Engineers (IEEE) 802.11 family of standards), BLUETOOTH® or the like.

20 Claims, 15 Drawing Sheets

Related U.S. Application Data continuation of application No. 16/848,174, filed on Apr. 14, 2020, now Pat. No. 11,240,217, which is a continuation of application No. 16/057,094, filed on Aug. 7, 2018, now Pat. No. 10,652,223, which is a continuation of application No. 15/394,526, filed on Dec. 29, 2016, now Pat. No. 10,057,225.

(51) Int. Cl.
G06Q 20/32 (2012.01)
G06Q 20/36 (2012.01)
H04L 9/40 (2022.01)
H04L 67/104 (2022.01)
H04W 12/069 (2021.01)

(52) U.S. Cl.
CPC ....... *G06Q 20/367* (2013.01); *H04L 63/0823* (2013.01); *H04L 67/104* (2013.01); *H04W 12/069* (2021.01)

(56) References Cited

U.S. PATENT DOCUMENTS

| | | |
|---|---|---|
| 5,748,735 A | 5/1998 | Ganesan |
| 5,872,844 A | 2/1999 | Yacobi |
| 5,878,138 A | 3/1999 | Yacobi |
| 5,920,630 A | 7/1999 | Wertheimer et al. |
| 6,250,557 B1 | 6/2001 | Forslund et al. |
| 6,266,421 B1 | 7/2001 | Domyo et al. |
| 6,587,948 B1 | 7/2003 | Inazawa et al. |
| 7,118,027 B2 | 10/2006 | Sussman |
| 7,120,609 B1 | 10/2006 | Kerkdijk |
| 7,207,480 B1 | 4/2007 | Geddes |
| 7,392,226 B1 | 6/2008 | Sasaki et al. |
| RE40,444 E | 7/2008 | Linehan |
| 7,702,898 B2 | 4/2010 | Tan |
| 7,822,688 B2 | 10/2010 | Labrou et al. |
| 8,041,338 B2 | 10/2011 | Chen et al. |
| 8,291,065 B2 | 10/2012 | Goodman et al. |
| 8,423,462 B1 | 4/2013 | Amacker et al. |
| 8,577,803 B2 | 11/2013 | Chatterjee et al. |
| 8,583,926 B1 | 11/2013 | Benson |
| 8,595,502 B2 | 11/2013 | Saito |
| 8,732,022 B2 | 5/2014 | White |
| 8,739,267 B2 | 5/2014 | Le Rouzic et al. |
| 8,761,397 B1 | 6/2014 | Wright |
| 8,769,260 B1 | 7/2014 | Kwan et al. |
| 8,839,369 B1 | 9/2014 | Dai et al. |
| 8,849,075 B2 | 9/2014 | Painter et al. |
| 8,880,896 B1 | 11/2014 | Elliott |
| 8,903,093 B2 | 12/2014 | Kim et al. |
| 9,208,488 B2 | 12/2015 | Liberty |
| 9,246,672 B2 | 1/2016 | Smith |
| 9,317,018 B2 | 4/2016 | Spodak et al. |
| 9,704,143 B2 | 7/2017 | Walker et al. |
| 9,721,147 B1 | 8/2017 | Kapczynski |
| 9,734,345 B2 | 8/2017 | Spodak et al. |
| 9,858,572 B2 | 1/2018 | Brickell et al. |
| 9,898,740 B2 | 2/2018 | Weller |
| 9,904,800 B2 | 2/2018 | Spodak et al. |
| 9,940,618 B2 | 4/2018 | Kang |
| 10,057,061 B1 | 8/2018 | Maeng et al. |
| 10,057,225 B1 | 8/2018 | Hayes et al. |
| 10,075,300 B1 | 9/2018 | Maeng et al. |
| 10,326,601 B1 | 6/2019 | Maeng et al. |
| 10,505,731 B1 | 12/2019 | Maeng et al. |
| 10,505,743 B1 | 12/2019 | Maeng et al. |
| 10,652,223 B1 | 5/2020 | Hayes et al. |
| 10,853,798 B1 | 12/2020 | Maeng et al. |
| 10,958,442 B1 | 3/2021 | Maeng et al. |
| 10,965,469 B1 | 3/2021 | Maeng et al. |
| 11,240,217 B1 | 2/2022 | Hayes et al. |
| 11,516,018 B1 | 11/2022 | Maeng et al. |
| 11,516,019 B1 | 11/2022 | Maeng et al. |
| 11,611,543 B1 | 3/2023 | Hayes et al. |
| 2001/0007983 A1 | 7/2001 | Lee |
| 2005/0114367 A1 | 5/2005 | Serebrennikov |
| 2006/0159260 A1 | 7/2006 | Pereira et al. |
| 2006/0165060 A1 | 7/2006 | Dua |
| 2007/0094727 A1 | 4/2007 | Singh |
| 2007/0125838 A1* | 6/2007 | Law ................ G06Q 20/3223 705/65 |
| 2007/0125840 A1* | 6/2007 | Law ................ G06Q 20/326 705/65 |
| 2008/0022089 A1 | 1/2008 | Leedom |
| 2008/0114699 A1 | 5/2008 | Yuan |
| 2008/0208743 A1 | 8/2008 | Arthur et al. |
| 2009/0125429 A1* | 5/2009 | Takayama ........... G06Q 20/327 705/35 |
| 2010/0030651 A1 | 2/2010 | Matotek et al. |
| 2010/0191602 A1 | 7/2010 | Mikkelsen et al. |
| 2012/0005078 A1 | 1/2012 | Pitroda |
| 2012/0036067 A1 | 2/2012 | Lee et al. |
| 2012/0136732 A1 | 5/2012 | McMillen et al. |
| 2012/0159149 A1* | 6/2012 | Martin ............... H04W 12/069 713/151 |
| 2012/0198174 A1 | 8/2012 | Nellans et al. |
| 2012/0210041 A1 | 8/2012 | Flynn et al. |
| 2012/0221774 A1 | 8/2012 | Atkisson et al. |
| 2012/0239578 A1 | 9/2012 | Kang et al. |
| 2012/0240203 A1 | 9/2012 | Kling |
| 2012/0290449 A1 | 11/2012 | Mullen et al. |
| 2013/0275307 A1 | 10/2013 | Khan |
| 2013/0275656 A1 | 10/2013 | Talagala et al. |
| 2014/0032394 A1 | 1/2014 | Liberty et al. |
| 2014/0040147 A1 | 2/2014 | Varadarajan et al. |
| 2014/0046786 A1 | 2/2014 | Mazaheri et al. |
| 2014/0058937 A1 | 2/2014 | Watson |
| 2014/0058938 A1 | 2/2014 | Mcclung, III |
| 2014/0188719 A1 | 7/2014 | Poorachandran et al. |
| 2014/0279566 A1 | 9/2014 | Verma et al. |
| 2014/0337230 A1 | 11/2014 | Bacastow |
| 2014/0372298 A1 | 12/2014 | Singh et al. |
| 2014/0372299 A1 | 12/2014 | Singh et al. |
| 2015/0006377 A1 | 1/2015 | Kang |
| 2015/0067833 A1 | 3/2015 | Verma et al. |
| 2015/0254640 A1 | 9/2015 | Cassano et al. |
| 2015/0332395 A1 | 11/2015 | Walker et al. |
| 2016/0012465 A1 | 1/2016 | Sharp |
| 2016/0019542 A1 | 1/2016 | Eischen |
| 2016/0028550 A1 | 1/2016 | Gaddam et al. |
| 2016/0055483 A1 | 2/2016 | Liberty |
| 2016/0092696 A1 | 3/2016 | Guglani et al. |
| 2016/0117660 A1 | 4/2016 | Prakash et al. |
| 2016/0162882 A1 | 6/2016 | McClung |
| 2017/0032370 A1 | 2/2017 | Beltramino et al. |
| 2017/0243315 A1 | 8/2017 | Ellerstein |

OTHER PUBLICATIONS

"U.S. Appl. No. 15/264,532, Corrected Notice of Allowance dated May 2, 2018", 2 pgs.

"U.S. Appl. No. 15/264,532, Examiner Interview Summary dated Apr. 23, 2018", 2 pgs.

"U.S. Appl. No. 15/264,532, Notice of Allowance dated Apr. 23, 2018", 16 pgs.

"U.S. Appl. No. 15/264,540, Notice of Allowance dated Apr. 17, 2018", 2 pgs.

"U.S. Appl. No. 15/362,559, Non Final Office Action dated Jan. 17, 2020", 6 pgs.

"U.S. Appl. No. 15/362,559, Notice of Allowance dated Jul. 27, 2020".

"U.S. Appl. No. 15/362,559, Response filed Apr. 17, 2020 to Non Final Office Action dated Jan. 17, 2020", 7 pgs.

"U.S. Appl. No. 15/394,526, Corrected Notice of Allowance dated May 2, 2018", 2 pgs.

"U.S. Appl. No. 15/394,526, Examiner Interview Summary dated Apr. 20, 2018", 2 pgs.

"U.S. Appl. No. 15/394,526, Notice of Allowance dated Apr. 20, 2018", 17 pgs.

(56) References Cited

OTHER PUBLICATIONS

"U.S. Appl. No. 15/963,469, Notice of Allowance dated Feb. 1, 2019", 14 pgs.
"U.S. Appl. No. 16/041,000, Notice of Allowance dated Aug. 7, 2019".
"U.S. Appl. No. 16/041,000, Preliminary Amendment filed Nov. 7, 2018", 8 pgs.
"U.S. Appl. No. 16/057,067, Notice of Allowance dated Aug. 7, 2019".
"U.S. Appl. No. 16/057,067, Preliminary Amendment filed Dec. 21, 2018", 8 pgs.
"U.S. Appl. No. 16/057,094, Corrected Notice of Allowability dated Jul. 31, 2019", 8 pgs.
"U.S. Appl. No. 16/057,094, Notice of Allowability dated Oct. 2, 2019", 2 pgs.
"U.S. Appl. No. 16/057,094, Notice of Allowance dated Jul. 29, 2019", 11 pgs.
"U.S. Appl. No. 16/057,094, Notice of Allowance dated Dec. 31, 2019", 10 pgs.
"U.S. Appl. No. 16/057,094, Preliminary Amendment filed Nov. 27, 2019", 8 pgs.
"U.S. Appl. No. 16/057,094, Preliminary Amendment filed Dec. 26, 2018", 8 pgs.
"U.S. Appl. No. 16/436,366, Corrected Notice of Allowability dated Dec. 23, 2020", 2 pgs.
"U.S. Appl. No. 16/436,366, Notice of Allowance dated Nov. 16, 2020".
"U.S. Appl. No. 16/436,366, Preliminary Amendment filed Sep. 18, 2019", 8 pgs.
"U.S. Appl. No. 16/707,888, Corrected Notice of Allowability dated Mar. 3, 2021", 2 pgs.
"U.S. Appl. No. 16/707,888, Notice of Allowance dated Nov. 13, 2020".
"U.S. Appl. No. 16/848,174, Notice of Allowance dated Oct. 18, 2021", 14 pgs.
"U.S. Appl. No. 17/249,722, Notice of Allowance dated Jul. 25, 2022", 16 pgs.
"U.S. Appl. No. 17/249,724, Notice of Allowance dated Aug. 3, 2022", 15 pgs.
"U.S. Appl. No. 17/645,928, Corrected Notice of Allowability dated Nov. 28, 2022", 3 pgs.
"U.S. Appl. No. 17/645,928, Notice of Allowance dated Nov. 16, 2022".
"Business Description", SET Secure Electronic Transaction Specification, (May 1997), 80 pgs.
"Electronic Commerce Modeling Language", RFC 4112—Version 2 Specification, (Jun. 2005), 36 pgs.
"Formal Protocol Definition", SET Secure Electronic Transaction Specification, (May 1997), 262 pgs.
"How email works (MTA, MDA, MUA)", [Online]. Retrieved from the Internet: <URL: kioskea.net> http://ccm.net/contents/116-how-email-works-mta-mda-mua, (Jun. 2014), 2 pgs.
"Online E Wallet System with Decentralized Credential Keepers", Mobile Networks and Applications 8, (2003), 87-99.
"Programmers Guide", SET Secure Electronic Transaction Specification, (May 1997), 629 pgs.
"The 'mailto' URI Scheme", RFC 6068, (Oct. 2010), 17 pgs.
"Uniform Resource Identifier", RFC3986, (Jan. 2005), 61 pgs.
Crispin, M., "internet Message Access Protocol", Version 4rev1—Network Working Group RFC3501, (Mar. 2003), 108 pgs.
Klensin, J., "Simple Mail Transfer Protocol", RFC5321, (Oct. 2008), 96 pgs.
Labrou, Yannis, et al., "Wireless Wallet", The First Annual International Conference on Mobile and Ubiquitous Systems: Networking and Services, 2004. IEEE, (2004), 10 pgs.
Mallat, Niina, et al., "Mobile Banking Service", Communications of the ACM, vol. 47, No. 5, (May 2004), 42-46.
Myers, J., et al., "Post Office Protocol—Version 3 degree", RFC 1939, (May 1996), 24 pgs.
Zhao, Hao, et al., "The Concept of Secure Mobile Wallet", Internet Security, IEEE Xplore, 2011 World Congress, Feb. 21-23, 2011, (2011), 5 pgs.
"Application Serial No. 18 050,612, Notice of Allowance dated Aug. 21, 2023", 12 pgs.

\* cited by examiner

WIRELESS PEER TO PEER MOBILE WALLET CONNECTIONS

CROSS-REFERENCE TO RELATED APPLICATION

This application is a continuation of U.S. patent application Ser. No. 17/645,928, filed Dec. 23, 2021, which is a continuation of U.S. patent application Ser. No. 16/848,174, filed Apr. 14, 2020; now issued as U.S. Pat. No. 11,240,217, which is a continuation of U.S. patent application Ser. No. 16/057,094, filed Aug. 7, 2018, now issued as U.S. Pat. No. 10,652,223, which is a continuation of U.S. patent application Ser. No. 15/394,526, filed Dec. 29, 2016, now issued as U.S. Pat. No. 10,057,225, each of which are incorporated by reference herein in their entirety.

TECHNICAL FIELD

Embodiments pertain to wireless technologies. Some embodiments relate to peer-to-peer wireless technologies. Further embodiments pertain to peer-to-peer wireless communications.

BACKGROUND

Mobile devices are often capable of connecting to a multitude of different devices using many different wireless technologies. Examples include cellular network connections, Wireless Local Area Network (WLAN) connections, BLUETOOTH®, connections, Near Field Communication (NFC) connections.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example nonpayment elements include digital representations of driver's licenses, passports, student Ms, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol. Exemplary mobile wallets include but are not limited to APPLE PAY®, ANDROID PAY®, GOOGLE WALLET®, CURRENT C® by MCX®, SAMSUNG PAY®, and peer-to-peer payment apps such as VENMO®, SQUARE CASH®, and TILT APP©.

Presently, when paying for transactions, merchant hardware communicates with a mobile wallet on the customer's mobile device using Near Field Communications (NFC) technologies. NFC mobile wallet payments require very close distances to communicate. NEC also requires dedicated hardware that some mobile devices and some retail or other establishments do not have.

Disclosed in some examples are devices, systems, and machine readable mediums for establishing peer to peer mobile wallet communications (P2PMW) over short range wireless communication networks. These P2PMW communications allow exchange of information between two wallet clients. Example communications include payments (e.g., p2p payments or payments to a merchant wallet), providing identification, providing loans, and the like. The use of P2PMW communications opens up the prospect of anyone accepting payment from anybody else at any time. All that is needed is a computing device with a mobile wallet. Example short range wireless communications include Wireless LANs (MILAN) such as WIFI (e.g., communicating according to an Institute for Electrical and Electronics Engineers (IEEE) 802.11 family of standards), BLUETOOTH®, BLUETOOTH® LOW ENERGY (BLE), or the like.

Figure 1:
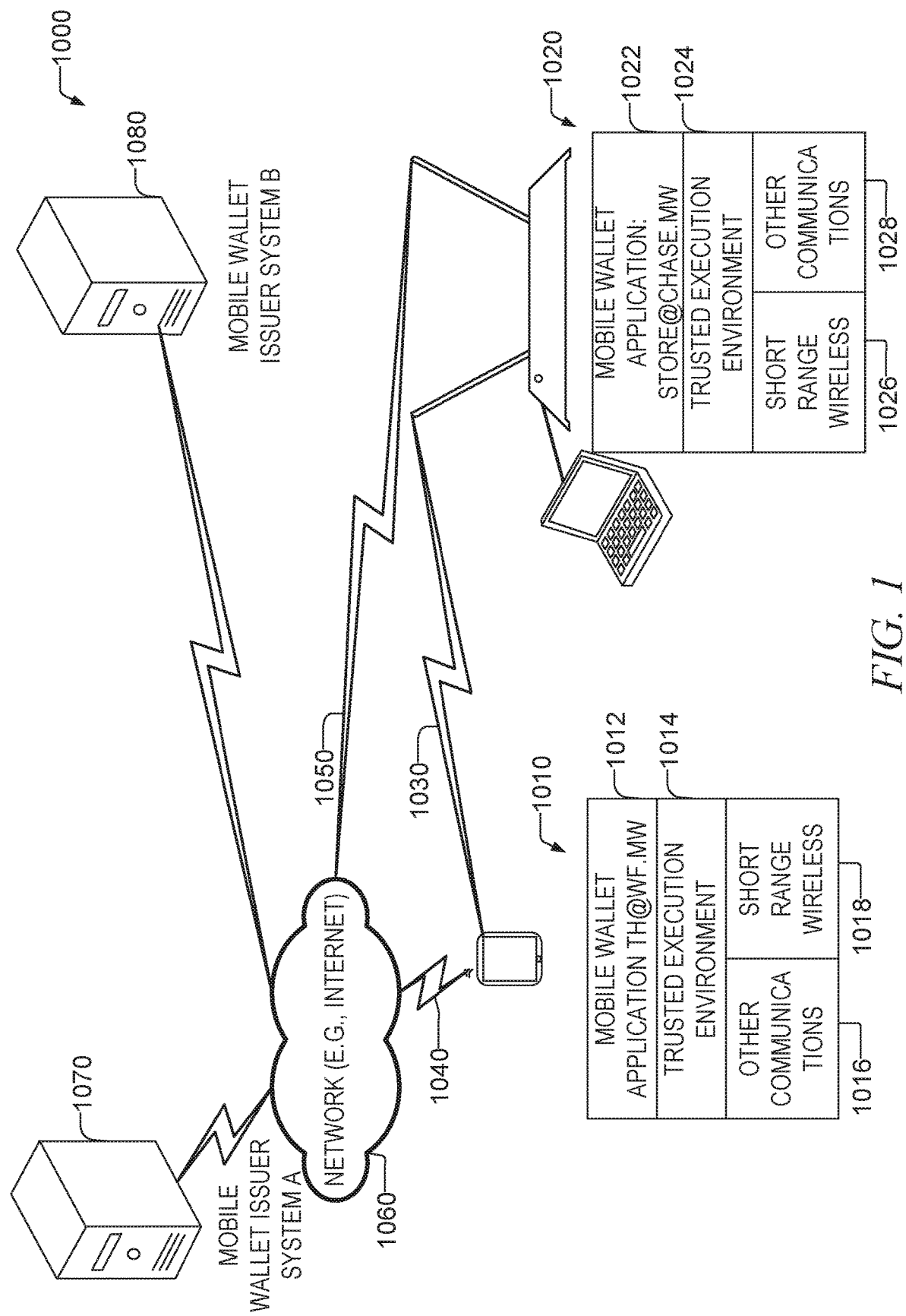
FIG. 1 shows an example P2PMW mobile wallet environment according to some examples of the present disclosure.

FIG. 1 shows an example P2PMW mobile wallet environment 1000 according to some examples of the present disclosure. Computing device 1010, shown as a mobile device (e.g., a cellphone, smartphone, tablet, or laptop) executes a mobile wallet application 1012. The mobile wallet application 1012 is associated with a particular user and is identified by a mobile wallet address "TH@WF.MW". Similar to an email address, the mobile wallet address has a username: "TH" and a domain name portion "WF.MW" which specifies a unique top level domain for mobile wallets (.MW). The mobile wallet application 1012 may run on a trusted execution environment 1014. Trusted execution environment 1014 may be an isolated execution environment provided by the processor of the computing device 1010 that provides various additional security features such as isolated execution, application integrity checking, and confidentiality. In other examples, the mobile wallet application 1012 may execute on an operating system of the computing device 1010. Computing device 1010 may also have short range wireless communications devices 1018 which may include one or more of: Wireless Local Area Network (WLAN) communications (e.g., such as according to an Institute for Electronics and Electrical Engineers (IEEE) 802.11 standard), BLUETOOTH®, BLE, Near Field Communications (NFC), and other technologies. Computing device 1010 may also have other communications devices 1016 such as a cellular communications device to communicate with one or more cellular networks.

Computing device 1020, shown as a laptop computer communicatively coupled to a wireless router also executes a mobile wallet application 1022. The mobile wallet application 1022 is associated with a particular user and is identified by a mobile wallet address "STORE@CHASE.MW". The mobile wallet application 1022 may run on a trusted execution environment 1024. Trusted execution environment 1024 may be a an isolated execution environment provided by the processor of the computing device 1020 that provides various additional security features such as isolated execution, application integrity checking, and confidentiality. In other examples, the mobile wallet application 1022 may execute on an operating system of the computing device 1020. Computing device 1020 may also have short range wireless communications devices 1028 which may include one or more of: WLAN communications (e.g., such as according to an Institute for Electrical and Electronics Engineers (IEEE) 802.11 standard), BLUETOOTH®, BLE, Near Field Communications (NFC), and other technologies. Computing device 1020 may also have other communications devices 1026 such as a cellular communications device to communicate with one or more cellular networks.

Computing devices 1010 and 1020 may establish a P2P wireless connection 1030 which may allow mobile wallet applications 1012 and 1022 to engage in P2PMW communications. Additionally, the computing devices 1010 and 1020 may connect to a network 1060, such as the Internet through second connections 1040 and 1050 (whether wired or wireless). In some examples, the computing device 1010 may connect to network 1060 through a wireless access point (AP) provided by computing device 1020.

Computing devices 1010 and 1020 may connect with their respective mobile wallet issuer systems (A and B) 1070 and 1080. A mobile wallet issuer computer system may be a computer system which may provision a mobile wallet, issue mobile wallet elements (e.g., payment elements, identity elements), and provide other services in managing the mobile wallet applications. For example, the mobile wallet issuer system may control and manage the mobile wallet domain (e.g., mobile wallet issuer system B 1080 may control the chase.mw domain). Messages and other communications for a particular mobile wallet may be routed through the Internet to the mobile wallets through these computer systems. Mobile wallet issuer systems may provide one or more services for enabling secure P2PMW communications.

P2PMW Device Discovery

WLAN and BLUETOOTH devices and networks are ubiquitous. Discovering the appropriate devices that are willing and able to connect for a P2PMW session may be difficult. Moreover, since mobile wallets may have sensitive financial and personal information, this personal information must be safeguarded. For example, when communicating via P2PMW the user may be prevented from connecting to nearby Bluetooth devices or WLAN access points that are not P2PMW devices. Additionally, certain preliminary P2PMW information (e.g., the mobile wallet address) may be necessary for a user to decide which mobile wallet application to connect to. In some examples, a mobile wallet ID may be obtained out-of-band (e.g., through inter-personal communications), and entered into or selected from (e.g., an address book of) the computing devices in order to search for and connect with that mobile wallet.

In some examples, in order to discover other devices to engage in P2PMW communications, one or both devices may advertise a mobile wallet service and may provide preliminary P2PMW information. Other mobile wallet applications may restrict the display of connectable devices to those that advertise the mobile wallet capability. Preliminary P2PMW information may include the address of the mobile wallet application, device information (e.g., IP address, Medium Access Control (MAC) address information, device configuration information), and the like. The way in which this information is discovered may vary depending on the underlying P2P wireless protocol.

Figure 2:
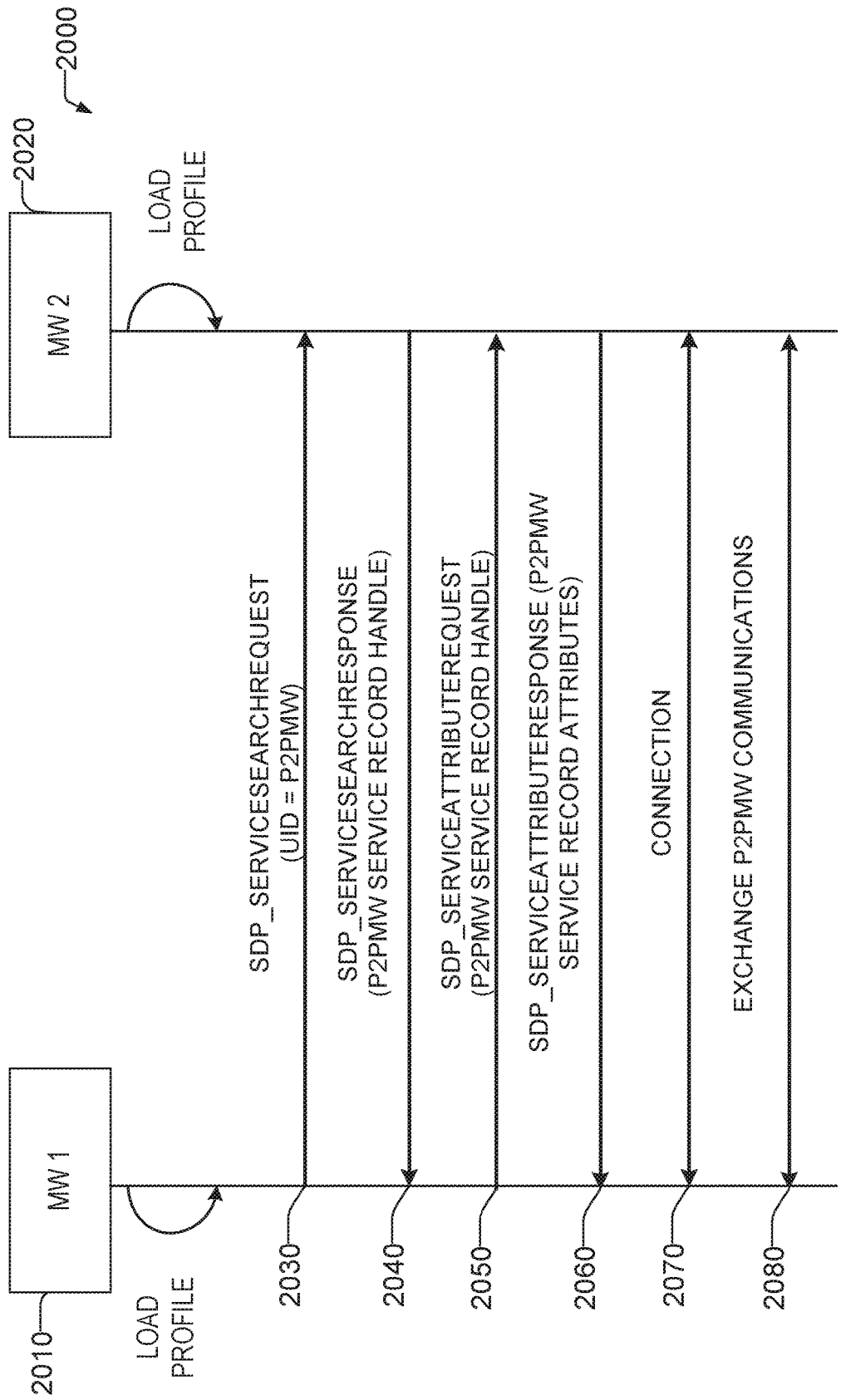
FIG. 2 shows a message sequence chart of a BLUETOOTH and BLE P2PMW discovery method according to some examples of the present disclosure.

FIG. 2 shows a message sequence chart 2000 of a BLUETOOTH and BLE P2PMW discovery method according to some examples of the present disclosure. The message sequence chart 2000 occurs subsequent to general BLUETOOTH and BLE device discovery (e.g., after the general device discovery, such as after the inquiry and response messages for BLUETOOTH and for BLE, after the advertisements and responses). In some examples, the message sequence chart 2000 may occur after a connection is established (e.g., after a page and response).

Mobile Wallet (MW) 1 2010 is searching for a P2PMW device to connect to and is probing mobile wallet (MW) 2 2020 to determine if it supports P2PMW. Each mobile wallet may load a particular profile (e.g., a Generic Attribute Profile GATT) indicating the service they are searching for. In this case, the P2PMW service. At 2030 MW 1 2010 sends a service search request in the form of a SDP_SERVICE-SEARCHREQUEST message specifying a Universal identifier (UID) set to a P2PMW service. This indicates that MW1 is searching for the P2PMW service. At 2040 MW2 responds with a service search response—SDP_SERVICE- SEARCHRESPONSE message with a P2PMW Service record handle if the P2PMW service exists. If the service does not exist, the flow may, terminate and MW1 may continue searching for a P2PMW communication partner.

At 2050, MW1 may pass the service record handle back to MW2 in a service attribute request—SDP_SERVICEAT-TRIBUTEREQUEST. This message may request the preliminary P2PMW information (e.g., the address). At message 2060 this information may be passed back to MW1 by MW2 in the form of a SDP_SERVICEATTRIBUTERE-SPONSE. If the user wishes to connect with this mobile wallet, the connection is made using messaging 2070 and P2PMW communications may be exchanged at messaging 2080.

While FIG. 2 shows an example message sequence chart for an SDP service search, in other examples, an extended inquiry response may be utilized to supply the P2PMW information (e.g., mobile wallet address). This reduces the amount of time necessary to provide a list of connectable P2PMW devices. For BLE, the P2PMW information (e.g., mobile wallet address) may be provided in an advertisement, or may be requested in response to an advertisement in a scan request and provided in a scan response message.

The tables below defines a new Wallet Service Profile that a mobile wallet application would use to search for other wallet client services and select specific wallet client services, using attributes and attribute values from table 2, to perform P2PMW communications. The table also defines attributes and values that would need to be used by wallet clients to manage communication methods and perform object management operations.

TABLE 1

| Characteristics | Wallet Service ID UUID | | |
| --- | --- | --- | --- |
| Wallet Holder | Name | Security | Permissions |
| Wallet Receiver | Name | Security | Permissions |
| Transfer Data | Type | Security | Permissions |
| Transfer Type | Name | N/A | N/A |
| Protocol | Name | Security | Permissions |

TABLE 2

| Attributes | Wallet Service ID UUID | | |
| --- | --- | --- | --- |
| Wallet Holder | Personal Name, Email | Auto-remove = Required Trigger = time, action Default | Read = required Write = Optional Default |
| Wallet Receiver | Personal Name, Email | Default | Default |
| Transfer Data | Public, Private | Symmetric = Shared Secret Asymmetric = PKI Auto-remove = required Trigger = time, action | Read = required Write = Optional |
| Transfer Type | Money Transfer, ID Transfer Medical Records | Default | Default |
| Protocol | SOAP | Symmetric = Shared Secret Asymmetric = PKI Auto-remove = required Trigger = time, action | Read = required Write = optional Executable = required |

Table 2 is an expanded version of Table 1 showing additional information on possible values of the various fields. Wallet holder can include one or more of a name, wallet address, personal email, phone number, or the like. Wallet receiver is the receiver of the transaction and can include one or more of a name, phone number, wallet address, personal email, or the like. Transfer Data may include information on a wallet transaction. Transfer Type may specify a type of transaction. The Protocol specifies the protocol used in communicating with the other mobile wallet. For example Simple Object Access Protocol (SOAP). Security may specify one or more allowable encryption key types (e.g., symmetric, asymmetric), data retention policies (e.g., automatically removing the value from the memory of the device), and triggers for that removal (e.g., when the data is removed—a time or action based trigger). Permissions specifies whether the recipient can read or write the field. In some examples, not all the fields in Tables 1 and 2 may be exchanged at once. For example, the mobile wallets may initially exchange one or more of the fields (e.g., protocol, encryption information, and authentication methods), authenticate themselves, and exchange the remaining items. During the authentication process they may exchange an encrypted QUID to allow their respective mobile wallet issuer systems to authenticate the other mobile wallet.

Figure 3:
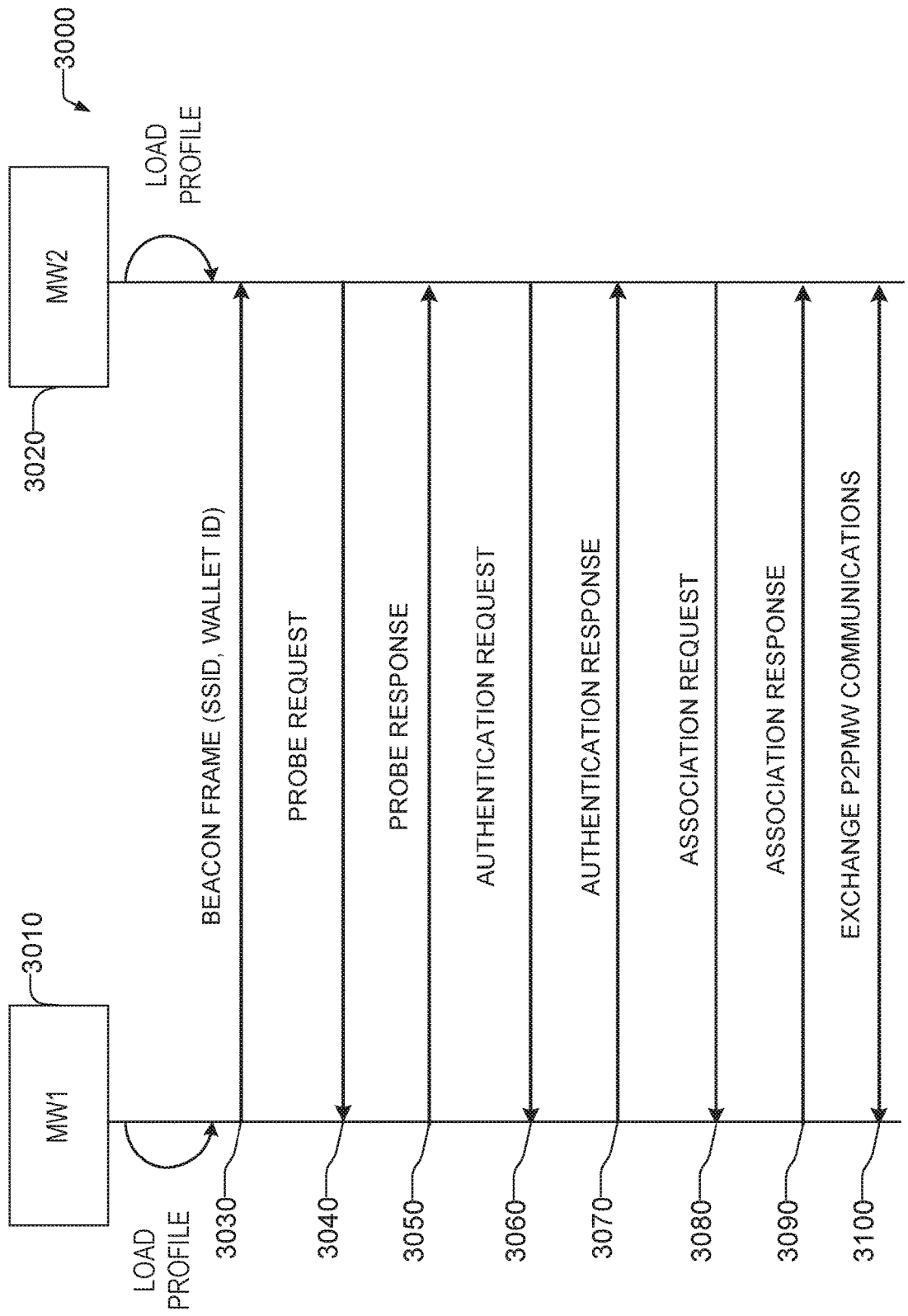
FIG. 3 shows a message sequence chart of a WEAN P2PMW discovery method according to some examples of the present disclosure.

FIG. 3 shows a message sequence chart 3000 of a WLAN P2PMW discovery method according to some examples of the present disclosure. Mobile wallet 1 (MW1) 3010 and mobile wallet 2 (MW2) 3020 are searching for P2PMW communication partners, MW1 3010 may be a WLAN access point. MW1 3010 may broadcast one or more beacon frames 3030 to advertise a connectable Service Set Identification (SSID). The beacon frame may include the SSID and other information—such as preliminary information for a P2PMW communication (e.g., the wallet address). In response, if MW2 3020 wishes to connect with MW1 3010 for a P2PMW connection, MW2 3020 may send a probe request 3040. The probe response 3050, authentication request 3060, authentication response 3070 association request 3080 and association response 3090 may be as specified in the IEEE 802.11 standard and constitute at least part of the messaging utilized to establish the wireless connection between MW2 3020 to the Base Service Set (BSS) provided by MW1 3010. Once MW1 3010 and MW2 3020 are connected, they may exchange P2PMW communications 3100.

Figure 4:
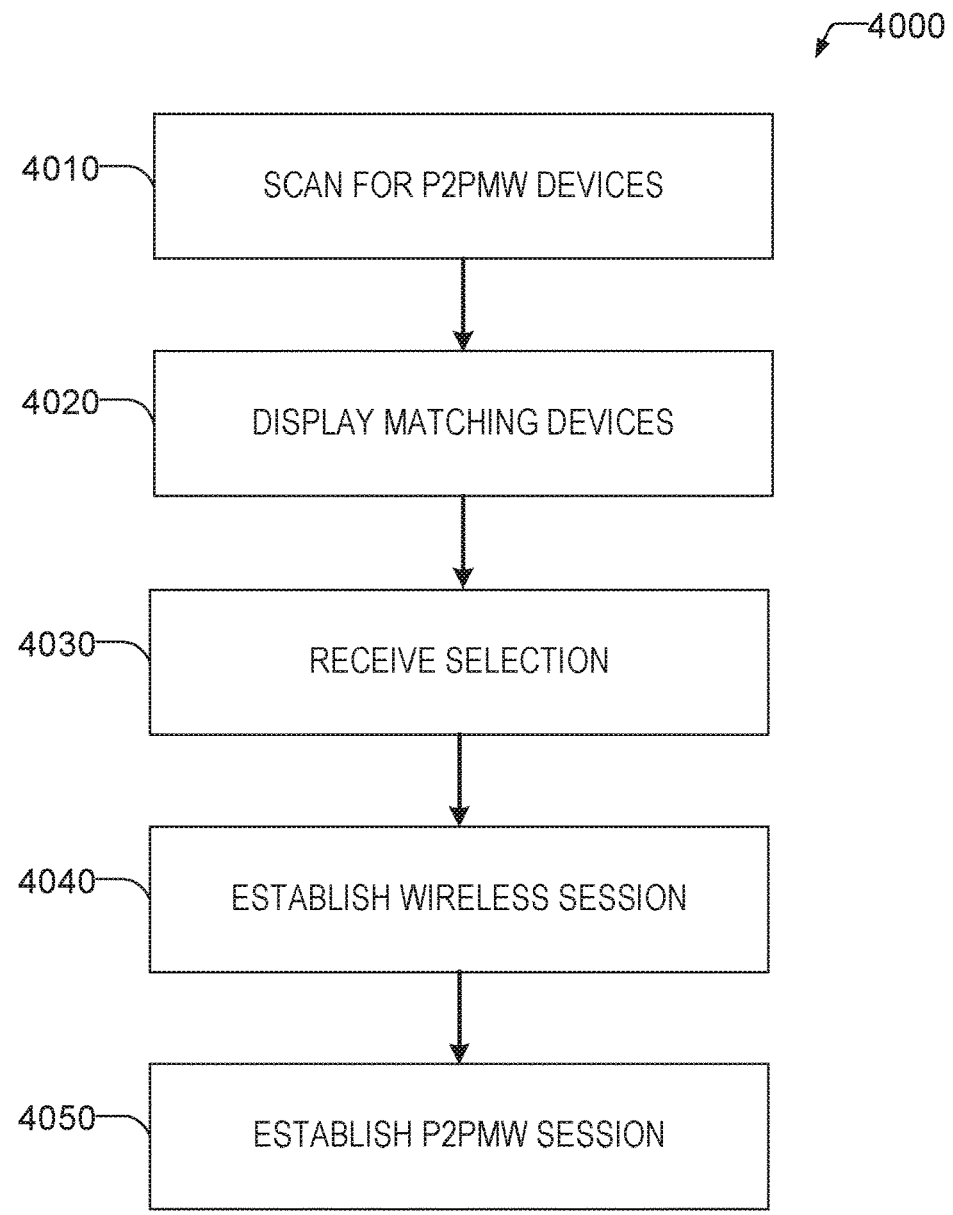
FIG. 4 shows a flowchart of a method of a mobile wallet finding other mobile wallet applications to engage in P2PMW communications according to some examples of the present disclosure.

FIG. 4 shows a flowchart of a method 4000 of a mobile wallet finding other mobile wallet applications to engage in P2PMW communications. At operation 4010 the computing device may scan for P2PMW devices. For example, the computing device may scan for beacon frames with preliminary P2PMW information (e.g., a P2PMW address). In BLUETOOTH devices, this may entail an inquiry and response message to ascertain BLUETOOTH devices nearby and their addresses, connecting to each nearby device, and utilizing the Service Discovery Protocol (SDP) as shown in FIG. 2 to ascertain whether the device supports P2PMW and the P2PMW preliminary information. For BLE devices, this may entail listening for advertisements, connecting to each device that sent an advertisement, and utilizing SDP messaging as shown in FIG. 2 to ascertain whether the device supports P2PMW and the P2PMW preliminary information. In other examples, rather than connecting and utilizing SDP, the preliminary P2PMW communications information may be ascertained by extended inquiry and response messaging. For WLAN devices, this may be done by scanning beacon frames.

At operation 4020 the computing device may display devices that are available for P2PMW communications on a display of the computing device. For example, in a GUI display. At operation 4030, the computing device may receive a selection of the mobile wallet application to connect with. At operation 4040, the physical wireless network session may be established. For example, if it is a WLAN connection, the WLAN or WLAN P2P connection may be established. At operation 4050, the wireless session may be utilized to create a P2PMW session. The P2PMW session may entail the exchange of mobile wallet information, security keys, or the like. For example, one of the methods described in FIGS. 6-13.

Figure 5:
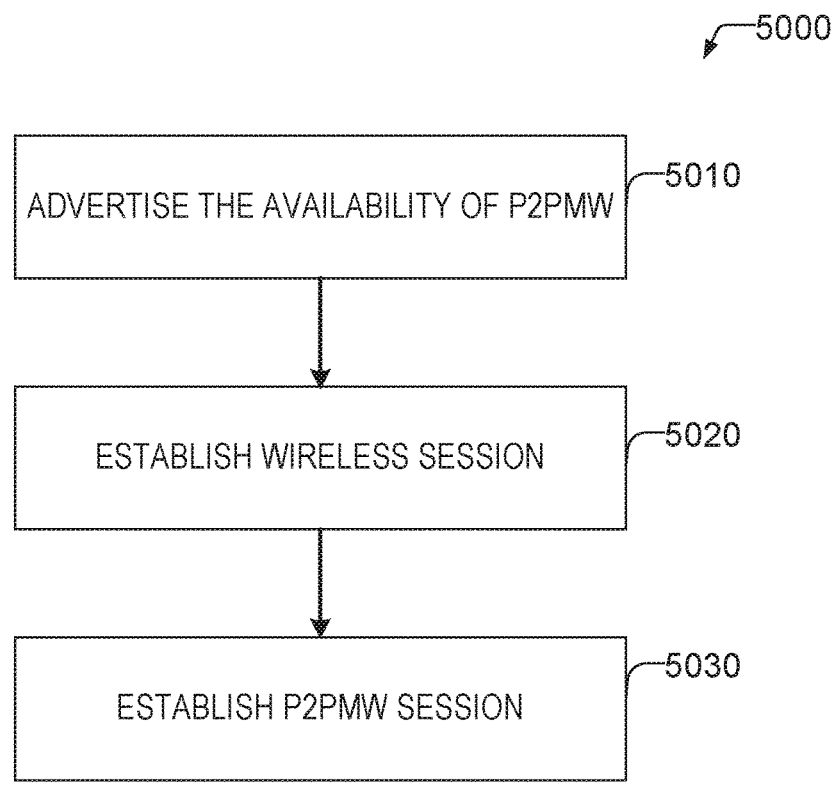
FIG. 5 shows a flowchart of a method of advertising availability for P2PMW communications according to some examples of the present disclosure.

FIG. 5 shows a flowchart of a method 5000 of advertising availability for P2PMW communications according to some examples of the present disclosure. At operation 5010 the computing device may advertise the availability of P2PMW communications. As noted, this may be done through responses to SDP protocol messages, done in extended inquiry responses, or through advertisements or beacon frames. At operation 5020 a wireless session is established. At operation 5030 a P2PMW session is established utilizing the wireless session.

P2PMW Session Establishment and Security

Despite being able to discover and connect to devices to perform P2PMW, there is an issue of ensuring that devices that a mobile wallet connects to are legitimate and the connection between them is secured from man in the middle attacks. For example, a nefarious user may setup a WLAN hotspot in a retail location and pretend to be a mobile wallet for the retailer. The nefarious user may then attempt to trick shoppers into connecting with and transferring money to these nefarious users. Furthermore, since mobile wallet communications often involve personal or financial information, these communications need to be secured against eavesdropping by utilizing cryptography. Key exchanges should be guarded against eavesdropping as well.

Identity Verification

In some examples, historical information about past transactions may be cached and may be used to verify another party in a P2PMW transaction. For example, in a first P2PMW communication transaction, information about the other mobile wallet such as a Medium Access Control (MAC) address, an IP Address, a device name, a device type, and the like may be cached. Upon connecting with another mobile wallet device (using the methods described above), the mobile wallet checks to see if the mobile wallet has previously transacted with the other mobile wallet device and has stored information about the device. For example, the computing device may scan a database to determine if it has cached information for the mobile wallet address of the present communications. If the mobile wallet has stored information about the other mobile wallet device, it may compare the information received about the other mobile device in the current session with the stored information from previous sessions. If the information matches, then it may be considered trusted. If the information does not match, the connection may be terminated and/or the user warned. In some examples, the mobile wallet service of the user may be contacted and the received information may be verified with the mobile wallet service. This may prevent Domain Name Spoofing (DNS) and other attacks.

In addition to prove identity, a sensor that is part of, or is communicatively coupled to, the computing device of the other party may send one or more sensor readings as part of the P2PMW session establishment to either the other party or to their respective mobile wallet issuer computer systems (who may then validate the identity and pass it to the other party via the other party's mobile wallet issuer computer system). Example sensors include biometric sensors (fingerprint, iris), camera (e.g., a picture of the user), and the like.

Key Exchanges

Aside from the problem of identifying the other party to a P2PMW communication, those communications should be safeguarded against eavesdropping. In one example, this is accomplished through the use of encryption, such as through public and private keypairs. Nevertheless, a problem exists on how to exchange these keys.

In some examples, in order to safely deliver public keys to each party of a P2PMW transaction, the mobile wallet services of each party may be utilized. For example, a first party P1 of the P2PMW connection may connect securely (e.g., using TLS/HTTPS) to their mobile wallet service provider and pass the preliminary P2PMW information collected (e.g., mobile wallet identity) about the other party P2, and also P1's public key to the mobile wallet service provider. The mobile wallet service provider may seek to verify the information collected about P2. If the information is not verified, the mobile wallet service provider may inform P1 that the transaction is not considered safe. P1 may then determine if it wishes to proceed anyway with the transaction.

If the information is verified, the mobile wallet service provider may pass the public key of P1 to P2's mobile wallet service provider and request the public key of P2 from P2's mobile wallet service provider. P2's mobile wallet service provider may reply with P2's public key, which may be passed to P1 by P1's mobile wallet service provider. Similarly, P2's mobile wallet service provider may validate P1's information and forward P1's public key to P2 over a secure connection (e.g., using TLS/HTTPS). Once each party P1 and P2 both have their public keys, they may begin their P2PMW session. Thus, because P1 trusts P1's mobile wallet service provider, and because P1's mobile wallet service provider trusts P2's mobile wallet service provider and P2 trusts P2's mobile wallet service provider, keys may be passed among trusted entities.

The information may be verified by the mobile wallet service provider computer system in a number of ways. For example, the mobile wallet service provider may also cache P2PMW information for a number of mobile wallet applications. New P2PMW information may be compared with cached information to determine if there is a match. If there is a match, the information can be considered verified. If there is not a match, the P2PMW connection may be deemed suspicious and the mobile wallet may be notified. In some examples, the mobile wallet service provider may verify the preliminary P2PMW information with the mobile wallet service provider of the target mobile wallet using the domain portion of the address.

Figure 6:
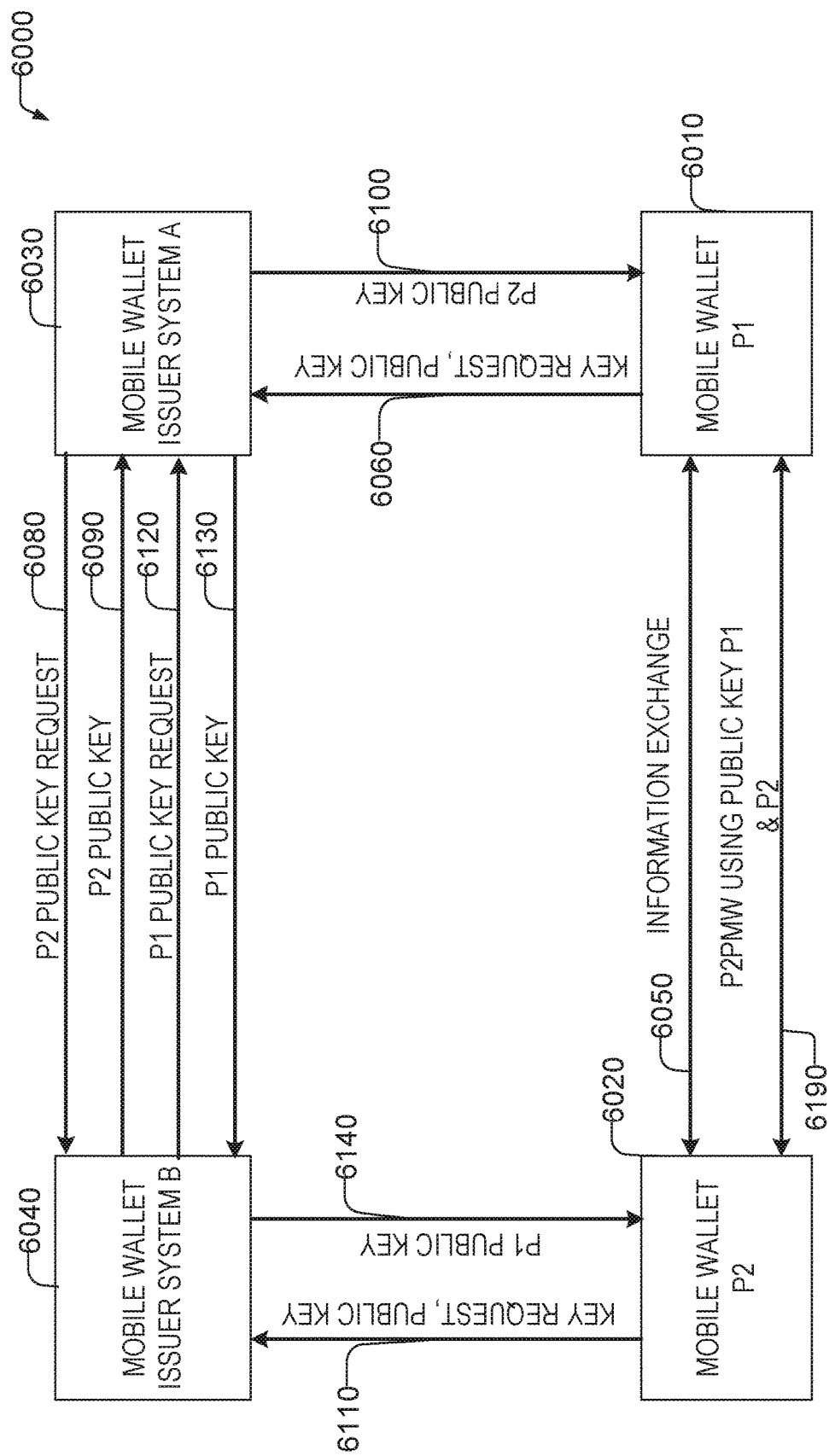
FIG. 6 shows an example schematic of a P2PMW party verification and encryption key passing method according to some examples of the present disclosure.

FIG. 6 shows an example schematic 6000 of a P2PMW party verification and encryption key passing method according to some examples of the present disclosure. Using messages 6050 mobile wallet. P1 6010 and mobile wallet p2 6020 exchange P2PMW communications information (e.g., preliminary information such as mobile wallet addresses). In some examples, this may be done utilizing the methods described in FIGS. 1-5. Mobile wallet P1 6010 sends a message 6060 requesting P2's public key to mobile wallet issuer system A 6030. This message may include mobile wallet P1's public key and information exchanged with messages 6050. For example, the mobile wallet address of mobile wallet P2 6020. Mobile wallet issuer system A 6030 may verify this information (as described above) and determine that mobile wallet P2 is serviced by mobile wallet issuer system B 6040. The mobile wallet issuer system may be determined based upon the domain information in the mobile wallet address.

If the information about mobile wallet P2 6020 provided by mobile wallet P1 6010 is verified, mobile wallet issuer system A 6030 may send a message 6080 requesting the public key of mobile wallet P2 6020 to mobile wallet issuer system B 6040. Mobile wallet issuer system B 6040 may provide the public key of mobile wallet P2 6020 with message 6090. The public key of mobile wallet P2 may be passed to mobile wallet p1 6010 by mobile wallet issuer system A 6030 with message 6100.

Similarly, mobile wallet p2 6020 may send a request message 6110 to mobile wallet issuer system B 6040 for the public key of mobile wallet P1, Request message 6110 may include P2's public key and information P2 has learned about mobile wallet P1 6010. Mobile wallet issuer system B 6040 may attempt to verify mobile wallet P1 based upon the information passed to mobile wallet issuer system B 6040 from mobile wallet P2 6020. If mobile wallet P1 6010 is verified, mobile wallet issuer system B 6040 may determine the mobile wallet issuer system servicing mobile wallet P1 6010 (e.g., from the domain portion of the mobile wallet address). The mobile wallet issuer system B 6040 may then contact mobile wallet issuer system A 6030 for mobile wallet P1's public key with message 6120, receiving the response with message 6130. The public key of P1 may then be passed to mobile wallet P2 6040 with message 6140. In some examples, rather than exchange 4 messages (6080, 6090, 6120, 6130) to exchange the two public keys, message 6080 requesting P2's public key may contain P1's public key, thus obviating the need for messages 6120 and 6130. In some examples, mobile wallet issuer system A 6030 and mobile wallet issuer system B may only send a public key for their respective mobile wallets (P1 and P2) when the other party to the communication has been verified. Thus, mobile wallet issuer system A 6030 may not send P1's public key until P2 is verified. Likewise, mobile wallet issuer system B 6040 may not send P2's public key until P1 is verified. Once the keys are sent, P2PMW communications 6190 may utilize these keys (e.g., mobile wallet P1 6010 may encrypt messages to mobile wallet P2 6020 with mobile wallet P2's public key and likewise mobile wallet P2 6020 may encrypt messages to mobile wallet 6010 with mobile wallet P1's 6010 public key).

In still other examples, rather that utilizing the mobile wallet service providers, P1 and P2 may utilize a cryptographic key exchange algorithm such as a Diffie Hellman algorithm and/or utilize one or more digital certificates to verify each other. For example, mobile wallet P1 6010 may exchange a digital certificate with P1 's public key that is signed by a certificate authority. Mobile wallet P2 6020 may then verify P1's identity by using a known public key of the certificate authority to validate the signature and extract mobile wallet P1's public key. Similarly, mobile wallet P2 6020 may send mobile wallet P1's 6010 digital certificate containing its public key and mobile wallet P1's 6010 digital certificate may be similarly authenticated by mobile wallet P2 6020.

Nonetheless, once proper cryptographic keys are determined, each side may then begin communicating using P2PMW communications.

Figure 7:
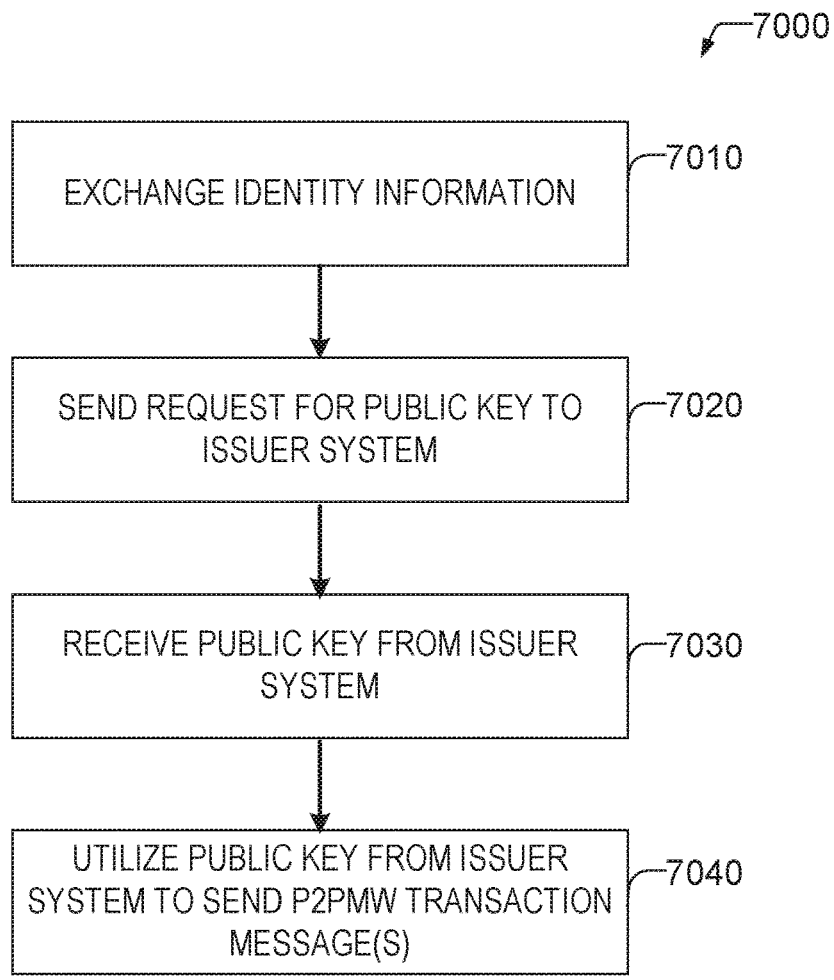
FIG. 7 shows a flowchart of a method for initiating a P2PMW communication session using an issuer system according to some examples of the present disclosure.

FIG. 7 shows a flowchart of a method 7000 for initiating a P2PMW communication session using an issuer system according to some examples of the present disclosure. At operation 7010 the mobile wallet application exchanges information with the recipient mobile wallet. This information may include P2PMW information such as the mobile wallet address, device information (e.g., MAC address, IP Address, hardware configuration, and the like), and the like. At operation 7020 this information, and in some examples, the public key of the mobile wallet may be sent to the mobile wallet issuer computer system. At operation 7030 in response, the public key of the other mobile wallet is received. At operation 7040 the public key of the recipient mobile wallet is utilized to send P2PMW transaction messages to the recipient mobile wallet.

Figure 8:
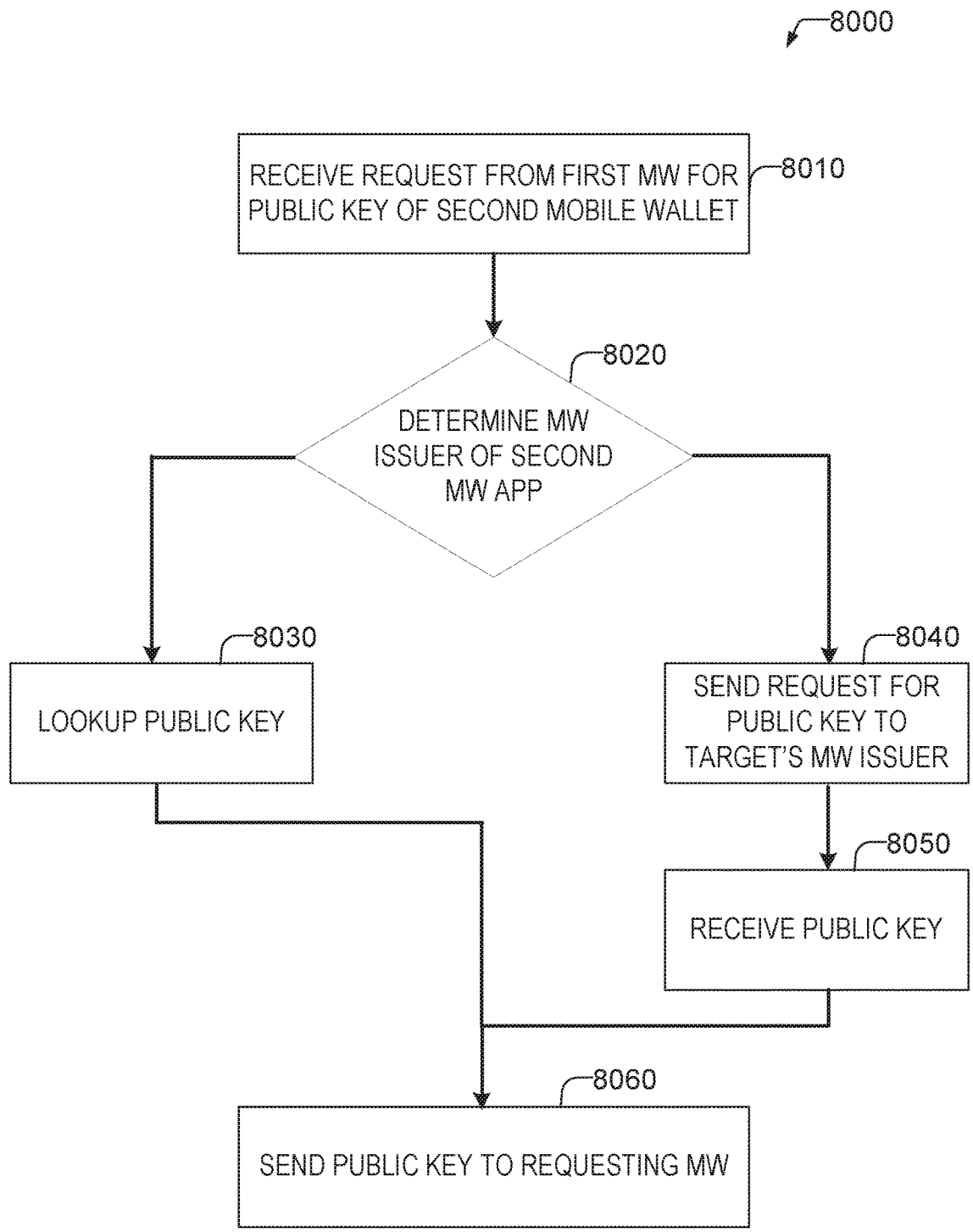
FIG. 8 shows a flowchart of a method of an issuer computer system assisting a P2PMW communication session according to some examples of the present disclosure.

FIG. 8 shows a flowchart of a method 8000 of an issuer computer system assisting a P2PMW communication session according to some examples of the present disclosure. At operation 8010 the issuer system receives a request from a first mobile wallet application for a public key of a second mobile wallet application. At operation 8020, the issuer system determines the mobile wallet issuer of the second mobile wallet application. If the issuer is the mobile wallet issuer system executing FIG. 8, then at operation 8030 the mobile wallet issuers system looks up the public key of the second mobile wallet (e.g., in a database, or by contacting the second mobile wallet). In some examples, this might be cached from a previous transaction. In other examples, the issuer system may store all mobile wallet public keys for mobile wallets serviced by the issuer. In yet other examples, the public key may be requested. At operation 8040 if the mobile wallet issuer system is different than the present system, a request is sent to that system. At operation 8050 the public key is received from that system. At operation 8060 the public key is sent to the requesting mobile wallet application.

P2PMW Transaction Key & Certificates

In some examples, rather than utilize mobile wallet public keys for the P2PMW exchange, the mobile wallet service provider of either P1 or P2 may create a P2PMW digital certificate. This certificate may include one or more session keys that are utilized during the P2PMW session only (or part of the P2PMW session). It may also include information signed by P1 's and P2's public keys to allow for verification. This P2PMW digital certificate may be provided to both parties by their respective mobile wallet service providers. In other examples, one party may provide the P2PMW certificate to the other party by encrypting it with the other party's public key.

Figure 9:
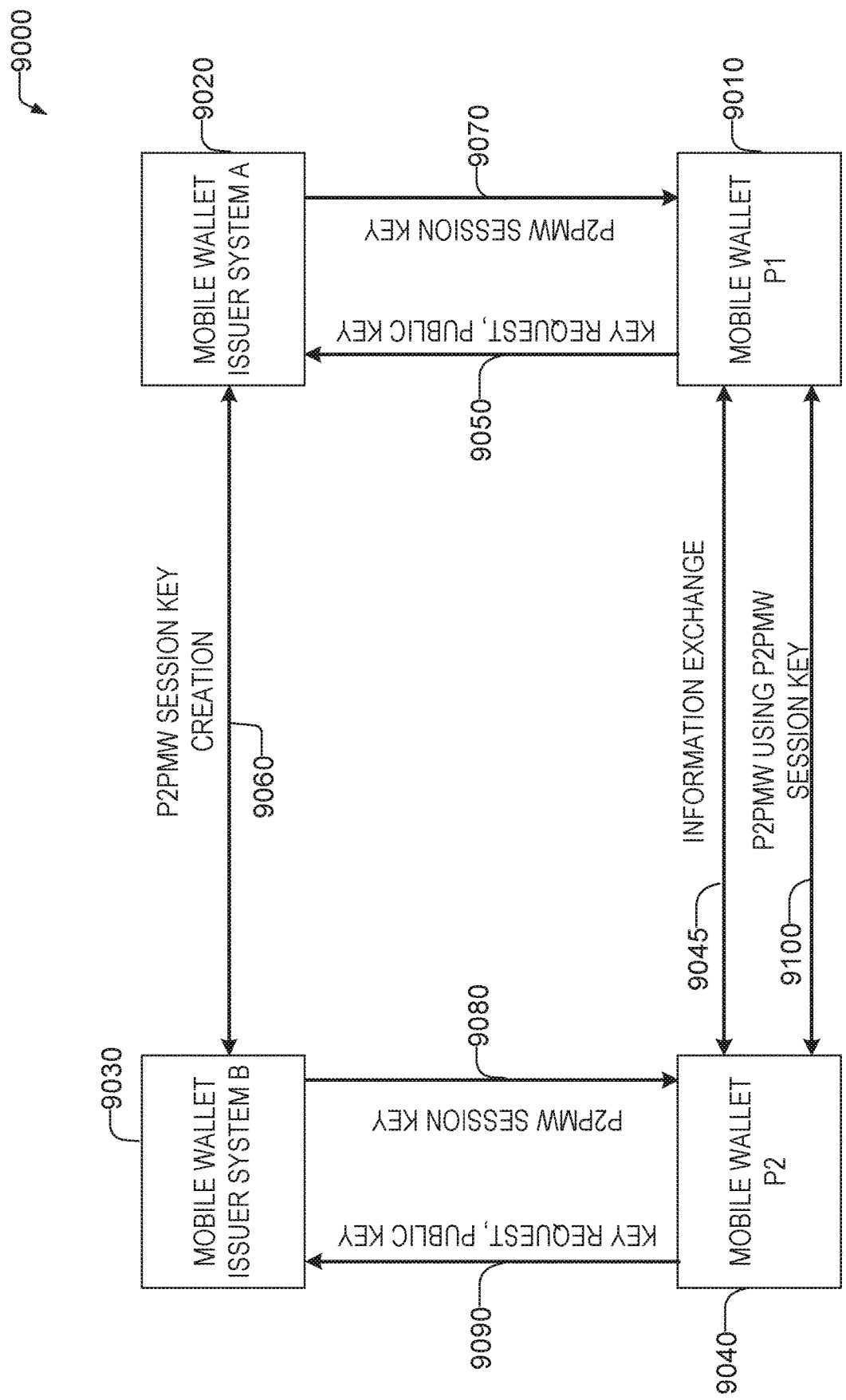
FIG. 9 shows one example schematic for generating a P2PMW session key according to some examples of the present disclosure.

FIG. 9 shows one example schematic 9000 for generating a P2PMW session key according to some examples of the present disclosure. Mobile wallet P1 9010 and Mobile wallet P2 9040 may communicate with each other 9045 over a P2P wireless connection to exchange P2PMW information (e.g., addresses). As noted, this may be done using various wireless messages, such as beacon messages, SDP messages, or the like. Once this information is obtained the mobile wallet P1 9010 and/or mobile wallet P2 may request the creation of a P2PMW session key using messages 9050 and 9090. In some examples, these requests include the respective public keys of mobile wallet p1 9010 and mobile wallet p2 9040. The mobile wallet issuer system A 9020 and mobile wallet issuer system B 9030 may exchange messages 9060 to create a P2PMW session key.

The P2PMW session key may be a cryptographic key created by the mobile wallet issuer system A 9020 or mobile wallet issuer system B 9030. In some examples, the same key is used to encrypt and decrypt P2PMW messages. In other examples, a key pair is created whereby a first key is utilized to encrypt the message and a second key is utilized to decrypt the message. In some examples, the key is a random number. In some examples, the key may be generated and exchanged between the mobile wallet issuer system B 9030 and the mobile wallet issuer system a 9020 using a Diffie Hellman key exchange algorithm.

Once the key is created it may be returned to the mobile wallet p1 9010 using message 9070 and mobile wallet P2 9040 using message 9080. The key may be encrypted using the public key of the respective mobile wallets to prevent eavesdropping. Once the keys are known to both mobile wallet P1 9010 and mobile wallet P2 9040, the parties may utilize the key to conduct P2PMW messages 9100.

The key generated by this process may be cached and stored by mobile wallets and utilized in subsequent communication sessions. However, in other examples, to increase security the key may have a lifetime associated with it. Once the lifetime has expired, a new key may be obtained and used.

In the example of FIG. 9, the session key was encrypted with mobile wallet P1's public key and then sent to mobile wallet P1. In other examples, the session key may be encrypted by mobile wallet issuer system A 9020 with mobile wallet P2's public key and sent to mobile wallet P1 9010. Likewise, mobile wallet issuer system B may encrypt the session key with mobile wallet p1's public key and send that to mobile wallet P2 9040. Mobile wallet P1 9010 and mobile wallet 9040 may then exchange these encrypted keys, decrypt them with their private keys and then use the decrypted key.

Figure 10:
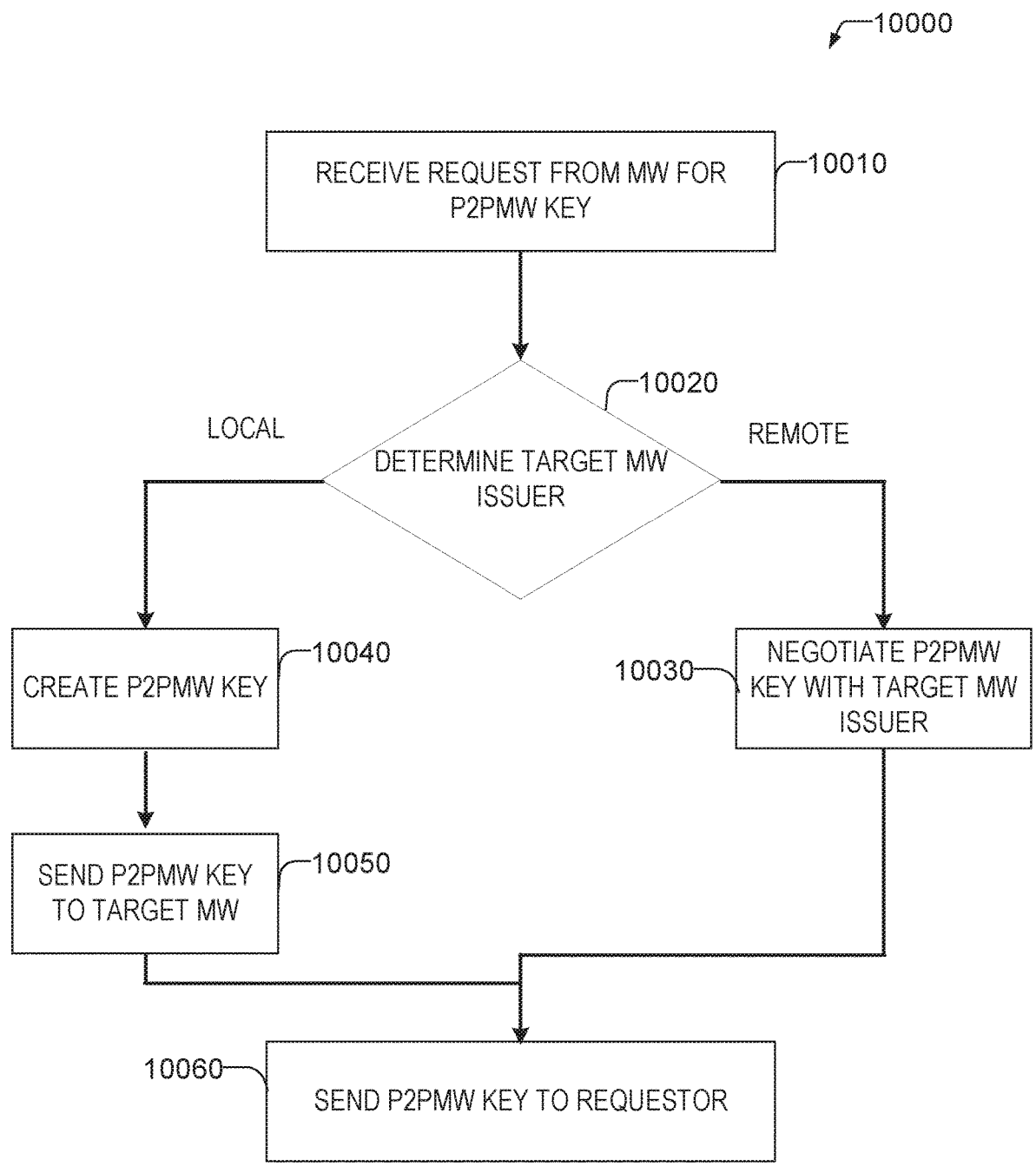
FIG. 10 shows a flowchart of a method of an issuer computer system issuing a P2PMW public key according to some examples of the present disclosure.

FIG. 10 shows a flowchart of a method 10000 of an issuer computer system issuing a P2PMW public key according to some examples of the present disclosure. At operation 10010 the issuer computer system may receive a request from a requestor mobile wallet for a P2PMW key. At operation 10020 the issuer system may determine from the request the mobile wallet issuer computer system of the target mobile wallet application (e.g., via the domain of the target mobile wallet application's address). If the target mobile wallet is remote—that is, the target mobile wallet is not serviced by this issuer computer system (e.g., the domain of the target mobile wallet application's address is not a domain managed by this issuer computer system), then the issuer computer system determines the target mobile wallet's issuer system. The issuer computer system then communicates with the target mobile wallet's issuer system to negotiate the P2PMW key at operation 10030. In some examples, this may include generating a P2PMW key and sending it to the target mobile wallet application's issuer computer system. In other examples, it may include receiving a P2PMW key to use in the transaction from the target mobile wallet application's issuer computer system. In still other examples, each issuer system may generate a portion of the P2PMW key (e.g., using a Diffie Hellman algorithm).

If the target mobile wallet application's address indicates they are serviced by the mobile wallet issuer computer system, then at operation 10040 the issuer computer system creates the P2PMW key. At operation 10050 the issuer computer system sends the P2PMW key to the target mobile wallet application. At operation 10060 the issuer computer system returns the P2PMW key to the requestor mobile wallet application. Messages sent from the mobile wallet issuer system may be encrypted using the mobile wallet's public key, and messages received from the mobile wallets may be encrypted with the mobile wallet issuer computer system's public key (and decrypted with its private key) to ensure security. Likewise, the connection between two issuer computer systems may also be encrypted.

In still other examples, the session key sent to each respective mobile wallet may be a special digital certificate (e.g., a P2PMW digital certificate). That is, it may be part of a digital certificate created by each respective mobile wallet issuer system. For example, mobile wallet issuer system A 9020 may create a digital certificate signed with its private key. Mobile wallet p1 9010 may then receive this digital certificate and verify that the session key is correct based upon decrypting and verifying the signature using the public key of the mobile wallet issuer system A 9020, which may be preconfigured onto the mobile wallet at issuance. In some examples, the mobile wallet issuer system B 9030 may also include its signature in the digital certificate.

In some examples, the P2PMW certificate may include one or more of:
 1. A serial number
 2. The mobile wallet addresses of each of the P2PMW communicating parties.
 3. Signature algorithm
 4. Signature(s) Issuer (e.g., the issuer system)
 6. Validity period
 7. Key-usage
 8. Encrypted Session key
 9. Thumbprint algorithm
 10. Thumbprint (e.g., a hash of the certificate)

In still other examples, the digital certificate created for the P2PMW transaction may be based upon or contain digital certificates of both P1 and P2. For example, the P2PMW digital certificate may also include the digital certificates of P1 and P2. The mobile wallet issuer systems may also verify the identity of each mobile wallet prior to creating the P2PMW in some examples.

Figure 11:
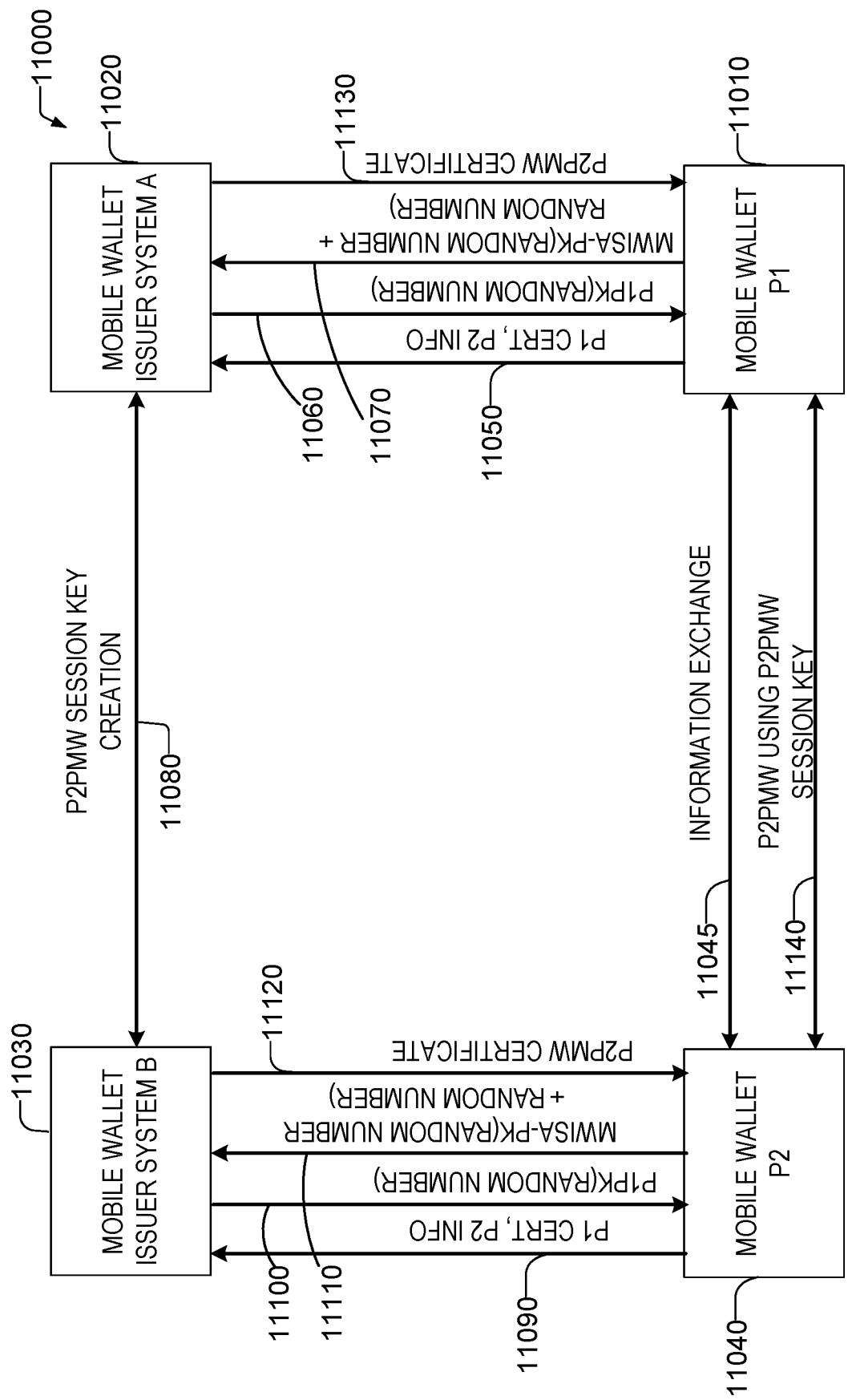
FIG. 11 shows one example schematic showing use of digital certificates and identity verification according to some examples of the present disclosure.

FIG. 11 shows one example schematic 11000 showing use of digital certificates and identity verification according to some examples of the present disclosure. Mobile wallet P1 11010 and mobile wallet P2 11040 exchange initial information with messages 11045. Mobile wallet P1 11010 sends a message 11050 requesting a P2PMW certificate and includes the information on mobile wallet P2 11040 and includes mobile wallet P1's 11010 digital certificate. Mobile wallet issuer system A 11020 verifies the certificate (and in some examples mobile wallet P2 11040) and generates a random number a 24 bit random number). This number is then encrypted with mobile wallet P1's public key and this encrypted number is sent back using message 11060. Mobile wallet issuer system A 11020 stores the random number. Mobile wallet P1 11010 decrypts the received encrypted random number using mobile wallet P1's 11010 private key. Mobile wallet P1 11010 then generates a second random number (24 bits) and encrypts both the received random number and the newly generated random number with the mobile wallet issuer system's public key (which may be pre-commissioned onto the mobile wallet application when the mobile wallet application was provisioned). These encrypted values are then sent back using message 11070, Mobile wallet issuer system A 11020 then verifies that the random number sent back matches the number sent in message 11060. If it matches, then mobile wallet issuer system A 11020 may communicate using messages 11080 with mobile wallet issuer system B 11030 to generate a P2PMW certificate, which may be passed to mobile wallet P1 11010 with message 11130.

Similarly, mobile wallet P2 11040 may engage in the same process of sending a request 11090, receiving an encrypted random number (encrypted with mobile wallet P2's public key) 11100, and sending a response (including both the random number received in message 11100 and a new random number) 11110. The P2PMW certificate may be delivered using messages 11120 and 11130. Finally, the mobile wallet applications may communicate using this P2PMW certificate using messages 11140.

Figure 12:
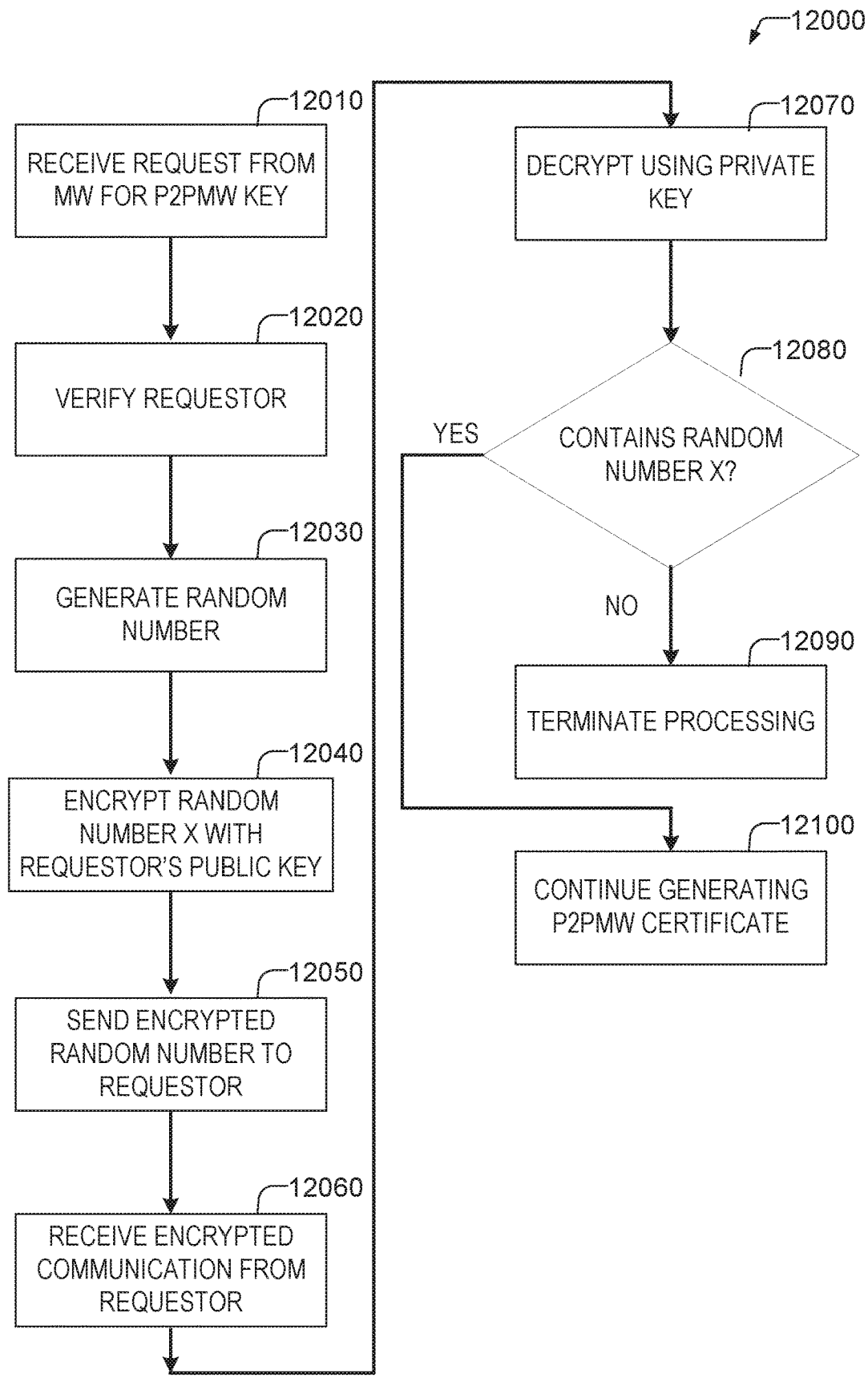
FIG. 12 shows a flowchart of a method of a mobile wallet issuer computer system creating a P2PMW certificate according to some examples of the present disclosure.

FIG. 12 shows a flowchart of a method 12000 of a mobile wallet issuer computer system creating a P2PMW certificate according to some examples of the present disclosure. At operation 12010 a request is received from a recipient mobile wallet application for a P2PMW key. At operation 12020 the requesting mobile wallet may be verified by verifying the digital signature in a digital certificate received in the request. At operation 12030 the mobile wallet issuer computer system may determine a random number X (e.g., a 24 bit random number). At operation 12040 the random number X may be encrypted with the requesting mobile wallet applications public key (received with the certificate in the request). At operation 12050 this encrypted random number is sent back to the requestor mobile wallet application. At operation 12060 an encrypted communication is received in response from the requestor mobile wallet application. At operation 12070 this communication is decrypted using the mobile wallet issuer computer system's private key. At operation 12080 if the communication, when decrypted, contains the random number (and another random number), then the mobile wallet issuer computer system continues with generating the P2PMW certificate 12100, such as by performing the steps of FIG. 10. If the communication cannot be decrypted or does not contain the random number X, then processing is terminated at operation 12090.

Figure 13:
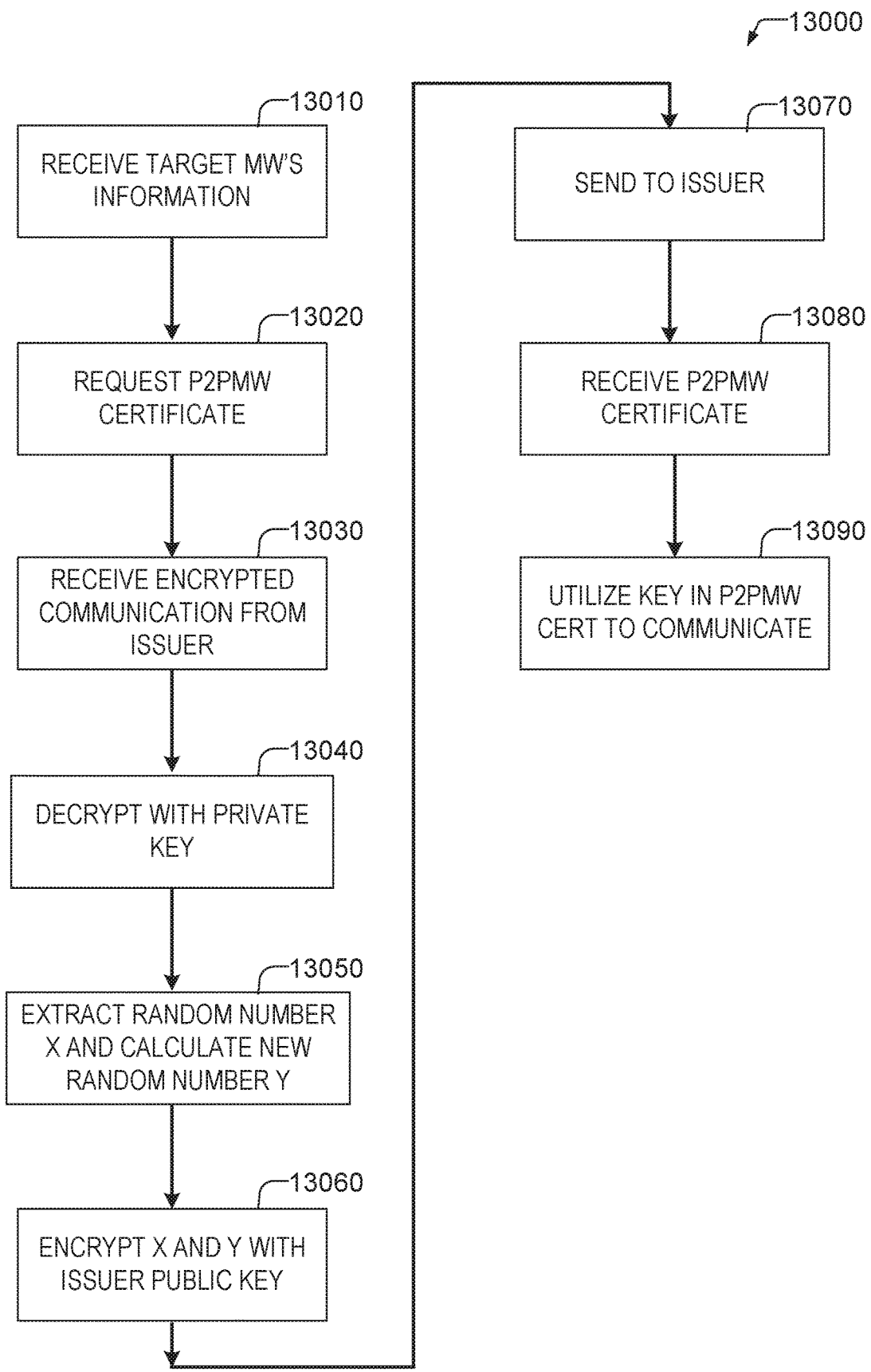
FIG. 13 shows a flowchart of a method of a mobile wallet application requesting a P2PMW certificate according to some examples of the present disclosure.

FIG. 13 shows a flowchart of a method 13000 of a mobile wallet application requesting a P2PMW certificate according to some examples of the present disclosure. Prior to FIG. 13, the mobile wallet application has received input from a GUI that the user wishes to engage in P2PMW communications, and has selected a P2PMW communication partner, At operation 13010 the mobile wallet application communicates with the target mobile wallet application to ascertain information about the target (e.g., the address). At operation 13020 the mobile wallet application may request the P2PMW certificate from the mobile wallet issuer computer system. At operation 13030 the mobile wallet application may receive an encrypted communication from the mobile wallet issuer computer system. At operation 13040 this communication is decrypted by the mobile wallet application with the mobile wallet application's private key. At operation 13050 the random number X may be extracted and new random number Y may be calculated. At operation 13060 a message with X and Y may be created and encrypted with the issuer computer system's public key. At operation 13070 the mobile wallet application may send this encrypted message to the mobile wallet issuer computer system, At operation 13080, the mobile wallet application may receive a P2PMW certificate. At operation 13090 a session key in this certificate may be utilized to communicate with the target mobile wallet application over the P2P wireless connection.

Figure 14:
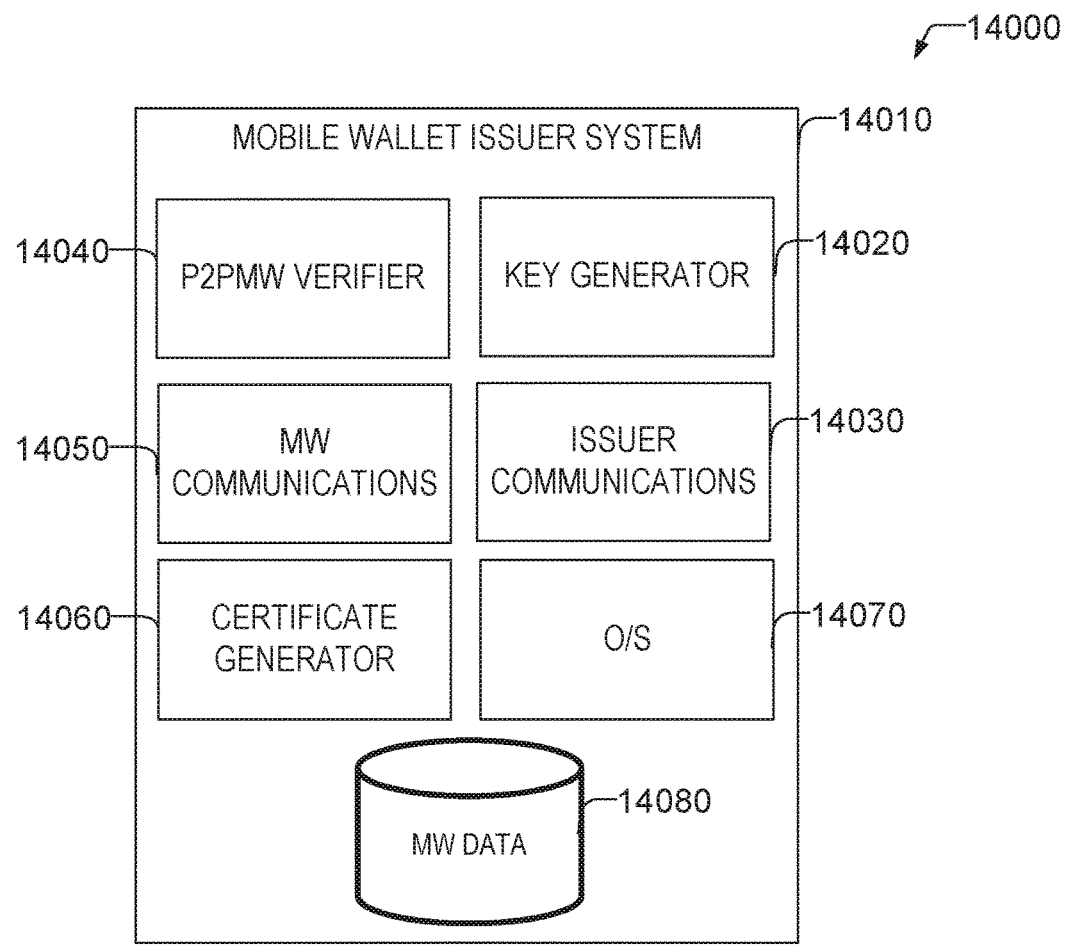
FIG. 14 is a block diagram of a logical configuration of a mobile wallet issuer system and a mobile wallet application according to some examples of the present disclosure.
Figure 14:
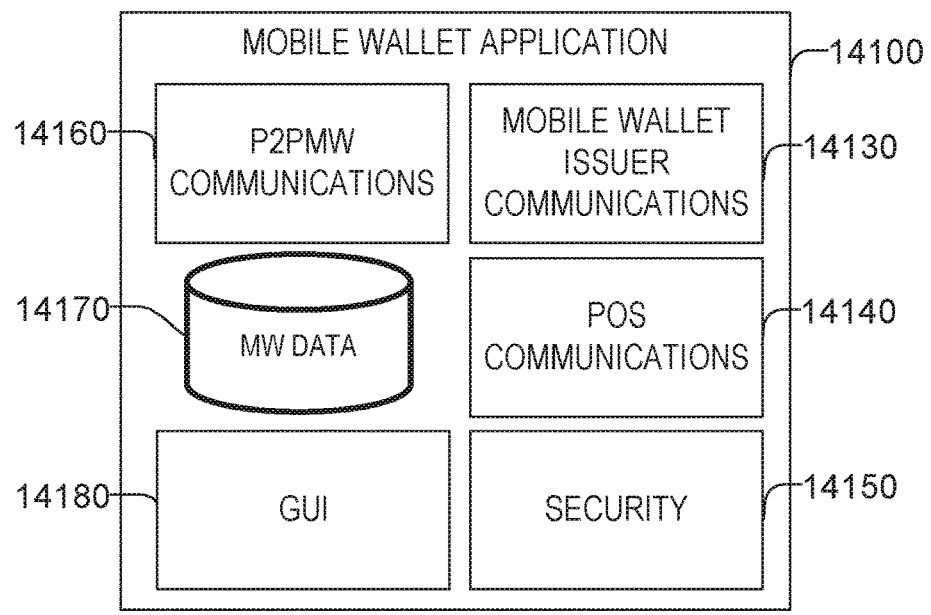

FIG. 14 is a block diagram 14000 of a logical configuration of a mobile wallet issuer system 14010 and a mobile wallet application 14100 according to some examples of the present disclosure. The components shown in FIG. 14 may be in the form of hardware, software, or a combination of hardware or software. The components of FIG. 14 may be one or more modules as described below. The configuration shown in FIG. 14 may be exemplary and other configurations (e.g., more or fewer components and different functionality for each component) may be utilized.

Mobile wallet issuer system 14010 may be an embodiment of mobile wallet issuer systems 1070, 1080, 6030, 6040, 9020, 9030, 11020, and 11030. Mobile wallet issuer system 14010 may perform the methods of FIGS. 8, 10, and 12. Mobile wallet issuer system 14010 may include an operating system (O/S) 14070 which may provide one or more application programming interfaces (API)s between the components of the mobile wallet application 14100 and the physical computing hardware, O/S 14070 may also provide process and thread scheduling, as well as memory management and allocation, and other functions. Key generator 14020 may generate one or more P2PMW keys or certificates as described above. This may include communicating with one or more other mobile wallet issuer systems. P2PMW verifier 14040 may verify P2PMW information (e.g., IP Address, MAC Address, and the like) based upon historical or other derived (e.g., through a Domain Name Service lookup) information and may communicate the results back to a requesting mobile wallet. Mobile wallet (MW) communications 14050 establishes and maintains a secure communication channel with one or more mobile wallet applications. Certificate generator 14060 may generate one or more P2PMW certificates and in the process perform identity verification of a requesting mobile wallet (e.g., as shown in FIG. 11). Issuer communications 14030 may setup and maintain one or more secure communicates with one or more other mobile wallet issuer systems 14010. Mobile wallet (MW) data 14080 may include verification data, data on mobile wallets that are provisioned and serviced by this mobile wallet issuer system 14010, data on finding and resolving which issuer system services which mobile wallet domains, mobile wallet public key data, and the like. Mobile wallet issuer system 14010 may have other components not shown for clarity, such as payment components, identification components, issuer components and the like that allow the mobile wallet issuer system 14010 to serve its function.

Mobile wallet application 14100 may be an example embodiment of mobile wallet application, such as a mobile wallet application 1012, 1022, 2010, 2020, 3010, 3020, 6010, 6020, 9010, 9040, 11040, 11010 and may implement the methods of FIGS. 4, 5, 7, and 13, Mobile wallet application 14100 may include a P2PMW communications component 14160 that may advertise, or scan for other advertisements for P2PMW connections. P2PMW communications component 14160 may also direct one or more transceivers and short range wireless stacks to connect with another computing device or scan the physical wireless medium for other computing devices reporting a P2PMW service, P2PMW communications may also send one or more messages to other mobile wallet applications. Mobile wallet issuer communications 14130 sets up and maintains a secure communication channel to the mobile wallet application's mobile wallet issuer computer system. POS communications 14140 may implement one or more protocols to exchange information with a merchant POS system (e.g., such as a tap to pay system). Security 14150 may verify information from other mobile wallet applications during P2PMW communications (e.g., using data cached in mobile wallet data 14170) or by contacting the mobile wallet issuer computer system. Security 14150 may also obtain cryptographic keys (e.g., a session key or a public key) for use in the P2PMW communications session. Security 14150 may also encrypt one or more messages for sending to other mobile wallet applications by P2PMW communications 14160. GUI 14180 may create one or more GUIs on a display of the computing device for selection of other mobile wallet applications and/or creating P2PMW messages, and the like. Mobile wallet data 14170 may include cached transaction data, the mobile wallet application 14100's public key, other cryptographic keys, payment elements, identification elements, other mobile wallet elements, and the like. Mobile wallet application 14100 may have other components not shown for clarity, such as payment components, identification components, issuer components and the like that allow the mobile wallet application 14100 to serve its function.

Figure 15:
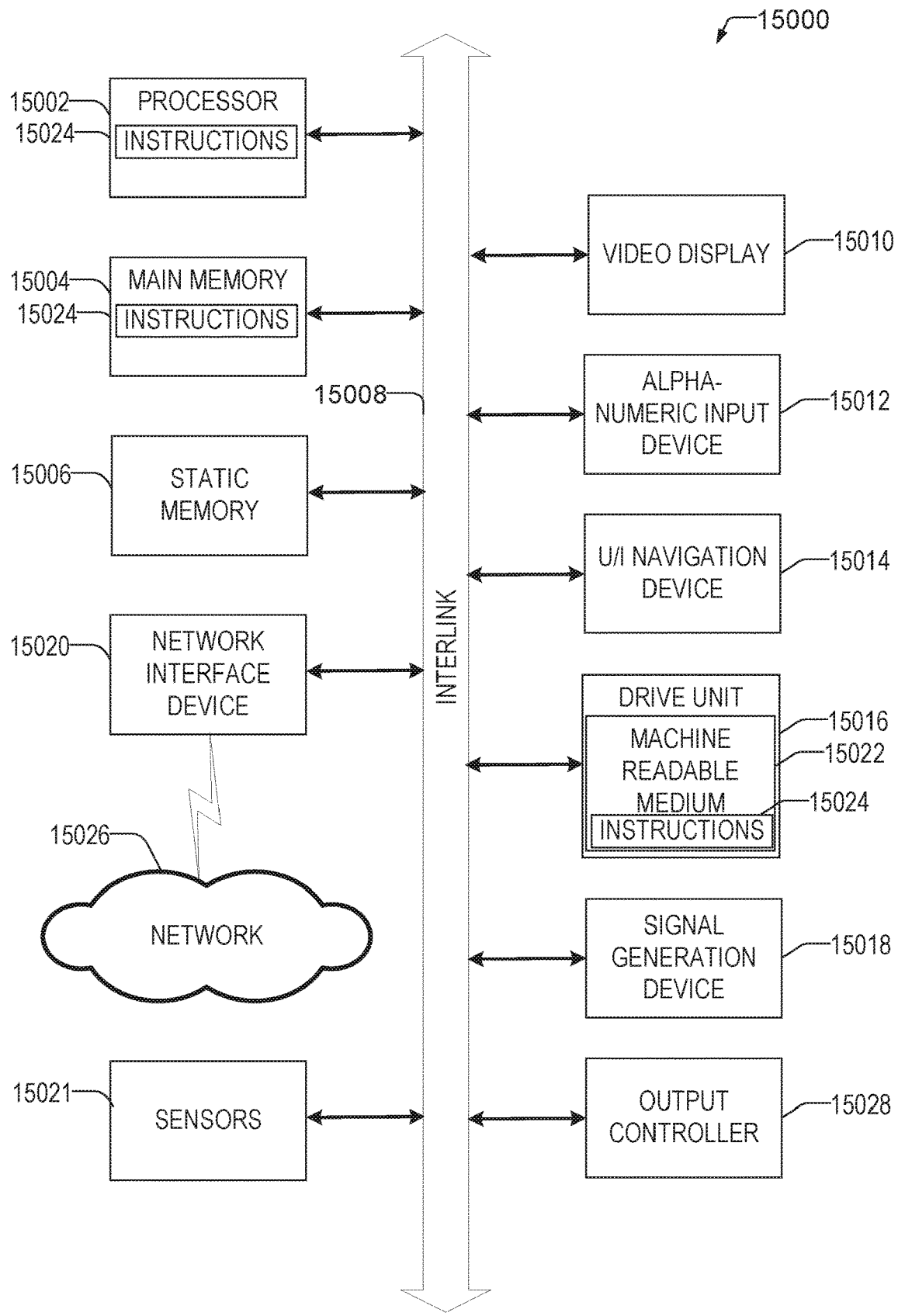
FIG. 15 is a block diagram illustrating an example of a machine upon which one or more embodiments may be implemented.

FIG. 15 illustrates a block diagram of an example machine 15000 upon which any one or more of the techniques (e.g., methodologies) discussed herein may perform. In alternative embodiments, the machine 15000 may operate as a standalone device or may be connected (e.g., networked) to other machines. In a networked deployment, the machine 15000 may operate in the capacity of a server machine, a client machine, or both in server-client network environments. In an example, the machine 15000 may act as a peer machine in peer-to-peer (P2P) (or other distributed) network environment. The machine 15000 may be a server computer, personal computer (PC), a tablet PC, a set-top box (SIB), a personal digital assistant (PDA), a mobile telephone, a smart phone, a web appliance, a network router, a switch or bridge, or any machine capable of executing instructions (sequential or otherwise) that specify actions to be taken by that machine. The machine may implement a computing device with a mobile wallet application, a mobile wallet issuer computer device, or any one of FIGS. 1-13. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 15000 may include a hardware processor 15002 (e.g., a central processing unit (CPU), a graphics processing unit (GPU), a hardware processor core, or any combination thereof), a main memory 15004 and a static memory 15006, some or all of which may communicate with each other via an interlink (e.g., bus) 15008. The machine 15000 may further include a display unit 15010, an alphanumeric input device 15012 (e.g., a keyboard), and a user interface (UI) navigation device 15014 (e.g., a mouse), In an example, the display unit 15010, input device 15012 and UI navigation device 15014 may be a touch screen display. The machine 15000 may additionally include a storage device (e.g., drive unit) 15016, a signal generation device 15018 (e.g., a speaker), a network interface device 15020, and one or more sensors 15021, such as a global positioning system (GPS) sensor, compass, accelerometer, or other sensor. The machine 15000 may include an output controller 15028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 15016 may include a machine readable medium 15022 on which is stored one or more sets of data structures or instructions 15024 (e.g., software) embodying or utilized by any one or more of the techniques or functions described herein. The instructions 15024 may also reside, completely or at least partially, within the main memory 15004, within static memory 15006, or within the hardware processor 15002 during execution thereof by the machine 15000, In an example, one or any combination of the hardware processor 15002, the main memory 15004, the static memory 15006, or the storage device 15016 may constitute machine readable media.

While the machine readable medium 15022 is illustrated as a single medium, the term "machine readable medium" may include a single medium or multiple media (e.g., a centralized or distributed database, and/or associated caches and servers) configured to store the one or more instructions 15024.

The term "machine readable medium" may include any medium that is capable of storing, encoding, or carrying instructions for execution by the machine 15000 and that cause the machine 15000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 15024 may further be transmitted or received over a communications network 15026 using a transmission medium via the network interface device

15020. The Machine 15000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POT'S) networks, and wireless data networks (e.g., Institute of Electrical and Electronics Engineers (WEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 15020 may include one or more physical jacks (e.g., Ethernet, coaxial, or phone jacks) or one or more antennas to connect to the communications network 15026. In an example, the network interface device 15020 may include a plurality of antennas to wirelessly communicate using at least one of single-input multiple-output (SIMO), multiple-input multiple-output (MIMO), or multiple-input single-output (MISO) techniques. In some examples, the network interface device 15020 may wirelessly communicate using Multiple User MIMO techniques.

The following is a non-limiting example and other example P2PMW concepts. These examples and concepts may be used in conjunction with, or independently of other concepts disclosed above.

Regarding Table 1 and Table 2, the mobile wallet service profile may be utilized for mobile wallets to communicate with each other. Mobile Wallet 1 can advertise itself publically so that other mobile wallets can find it and establish communication. In some examples, all mobile wallets can advertise themselves publically (like wifi hotspots) or they can be off line all the time and get activated only when connection requests come. For example, MW2 wants to connect with MW1. MW2 will get MW1's unique ID (or name) out-of-band and use that to send a connection request. For example, when Ram and Joon are in a coffee shop and Ram wants to send $5 to Joon, Rain can type-in Joon's mobile wallet ID and connect, or select Joon's mobile wallet ID from address book and connect, (or) if Joon's wallet advertise itself then Ram's wallet select Joon's wallet form the available and visible mobile wallets.

In some examples, the publically available mobile wallet information may be or include one or more of: mobile wallet name, (and/or) unique ID, owner name. In some examples, Unique ID can be a phone number. The actual UUID can be internal and need not be visible. In some examples, this ULM may only be exchanged only when actual money need to be transferred.

Ram's wallet connects with Joon's wallet using one of the options described in section 1.a. Now Joon's wallet accept the connection. It can be done in many ways. Joon can manually accept using the GUI or Joon can have default set in his mobile wallet to connect with his friends in the address book and the like.

Once MW2 and MW1 got connected they need to know whether they can speak the same language. This may be accomplished by exchanging the information in Tables 1 and 2. For example, the protocol name and version they will use, encryption and hashing standard, authentication method, application level protocol name and version, level/type of financial services they can perform, and the like. They can exchange the first three items, authenticate themselves and they can exchange the remaining items.

During the authentication process they can simply exchange the encrypted UUID so that their respective mobile wallet service provider's authenticate the other wallet. UUID can be encrypted using the banks private key so that the wallets can't get the ULM of the other wallet. To increase security a one time token can be generated that will represent the MID and other parameters and can be exchanged.

Once the wallets authenticate and identify themselves an actual transfer token can be generated by MW2 and sent to MW1 using the same channel (or for security a second channel can be opened and that information can be sent). MW1 submits the token and they conduct the P2PMW transaction (e.g., exchange funds).

What is claimed is:

1. A method of generating a session key for a mobile wallet to mobile wallet communication session, the method comprising:
    using one or more computer processors on a first computing device:
    receiving a request from a first mobile wallet application executing on a second computing device for the session key for a session between the first mobile wallet application and a second mobile wallet application executing on a third computing device, the request including information about the second mobile wallet application;
    identifying a mobile wallet issuer system based upon a domain in an address of the second mobile wallet application provided in the request, the mobile wallet issuer system executing on a fourth computing device;
    deriving the session key for the session between the first mobile wallet application and the second mobile wallet application using at least a first value derived by the first computing device and a second value derived by the fourth computing device; and
    transmitting the session key to the first mobile wallet application, the first mobile wallet application using the session key to engage in a financial transaction with the second mobile wallet application.

2. The method of claim 1, further comprising:
    sending the first mobile wallet application a random number encrypted using a public key of the first mobile wallet application responsive to receiving the request;
    receiving a message from the first mobile wallet application encrypted by a public key of the first computing device;
    decrypting the message from the first mobile wallet application using a private key of the first computing device corresponding to the public key of the first computing device to create a decrypted message; and
    verifying that the decrypted message from the first mobile wallet application includes the random number and a second random number; and
    wherein deriving the session key is done after verifying that the message from the first mobile wallet application includes the random number.

3. The method of claim 1, wherein deriving the session key for the session between the first mobile wallet application and the second mobile wallet application using at least the first value derived by the first computing device and the second value derived by the fourth computing device comprises using a Diffie-Hellman algorithm with the fourth computing device.

4. The method of claim 1, wherein the request includes information about the second mobile wallet application, the information about the second mobile wallet application comprising one or more of a Medium Access Control address, an IP address, a device name, or a device type.

5. The method of claim 4, further comprising:
determining that information about the second mobile wallet application does not match cached information related to a previous connection between the first mobile wallet application and the second mobile wallet application; and
responsive to determining that information about the second mobile wallet application does not match cached information related to a previous connection between the first mobile wallet application and the second mobile wallet application, notifying the first mobile wallet application that the second mobile wallet application may be suspicious.

6. The method of claim 1, wherein the mobile wallet issuer system for the second mobile wallet application sends the session key to the second mobile wallet application.

7. The method of claim 1, wherein the address of the second mobile wallet application is included in the information about the second mobile wallet application.

8. A computing device for generating a session key for a mobile wallet to mobile wallet communication session, the computing device comprising:
a hardware processor;
a memory, the memory storing instructions, which when executed by the hardware processor, cause the computing device to perform operations comprising:
receiving a request from a first mobile wallet application executing on a second computing device for the session key for a session between the first mobile wallet application and a second mobile wallet application executing on a third computing device, the request including information about the second mobile wallet application;
identifying a mobile wallet issuer system based upon a domain in an address of the second mobile wallet application provided in the request, the mobile wallet issuer system executing on a fourth computing device;
deriving the session key for the session between the first mobile wallet application and the second mobile wallet application using at least a first value derived by the computing device and a second value derived by the fourth computing device; and
transmitting the session key to the first mobile wallet application, the first mobile wallet application using the session key to engage in a financial transaction with the second mobile wallet application.

9. The computing device of claim 8, wherein the operations further comprise:
sending the first mobile wallet application a random number encrypted using a public key of the first mobile wallet application responsive to receiving the request;
receiving a message from the first mobile wallet application encrypted by a public key of the computing device;
decrypting the message from the first mobile wallet application using a private key of the computing device corresponding to the public key of the computing device to create a decrypted message; and
verifying that the decrypted message from the first mobile wallet application includes the random number and a second random number; and wherein deriving the session key is done after verifying that the message from the first mobile wallet application includes the random number.

10. The computing device of claim 8, wherein the operations of deriving the session key for the session between the first mobile wallet application and the second mobile wallet application using at least the first value derived by the computing device and the second value derived by the fourth computing device comprises using a Diffie-Hellman algorithm with the fourth computing device.

11. The computing device of claim 8, wherein the request includes information about the second mobile wallet application, the information about the second mobile wallet application comprising one or more of a Medium Access Control address, an IP address, a device name, or a device type.

12. The computing device of claim 11, wherein the operations further comprise:
determining that information about the second mobile wallet application does not match cached information related to a previous connection between the first mobile wallet application and the second mobile wallet application; and
responsive to determining that information about the second mobile wallet application does not match cached information related to a previous connection between the first mobile wallet application and the second mobile wallet application, notifying the first mobile wallet application that the second mobile wallet application may be suspicious.

13. The computing device of claim 8, wherein the mobile wallet issuer system for the second mobile wallet application sends the session key to the second mobile wallet application.

14. The computing device of claim 8 wherein the address of the second mobile wallet application is included in the information about the second mobile wallet application.

15. A non-transitory, machine-readable medium, storing instructions for generating a session key for a mobile wallet to mobile wallet communication session, the instructions, when executed by a computing device, cause the computing device to perform operations comprising:
receiving a request from a first mobile wallet application executing on a second computing device for the session key for a session between the first mobile wallet application and a second mobile wallet application executing on a third computing device, the request including information about the second mobile wallet application;
identifying a mobile wallet issuer system based upon a domain in an address of the second mobile wallet application provided in the request, the mobile wallet issuer system executing on a fourth computing device;
deriving the session key for the session between the first mobile wallet application and the second mobile wallet application using at least a first value derived by the computing device and a second value derived by the fourth computing device; and
transmitting the session key to the first mobile wallet application, the first mobile wallet application using the session key to engage in a financial transaction with the second mobile wallet application.

16. The non-transitory machine-readable medium of claim 5, wherein the operations further comprise:
sending the first mobile wallet application a random number encrypted using a public key of the first mobile wallet application responsive to receiving the request;

receiving a message from the first mobile wallet application encrypted by a public key of the computing device;

decrypting the message from the first mobile wallet application using a private key of the computing device corresponding to the public key of the computing device to create a decrypted message; and verifying that the decrypted message from the first mobile wallet application includes the random number and a second random number; and wherein deriving the session key is done after verifying that the message from the first mobile wallet application includes the random number.

17. The non-transitory machine-readable medium of claim 15, wherein the operations of deriving the session key for the session between the first mobile wallet application and the second mobile wallet application using at least the first value derived by the computing device and the second value derived by the fourth computing device comprises using a Diffie-Hellman algorithm with the fourth computing device.

18. The non-transitory machine-readable medium of claim 15, wherein the request includes information about the second mobile wallet application, the information about the second mobile wallet application comprising one or more of a Medium Access Control address, an IP address, a device name, or a device type.

19. The non-transitory machine-readable medium of claim 18, wherein the operations further comprise:

determining that information about the second mobile wallet application does not match cached information related to a previous connection between the first mobile wallet application and the second mobile wallet application; and responsive to determining that information about the second mobile wallet application does not match cached information related to a previous connection between the first mobile wallet application and the second mobile wallet application, notifying the first mobile wallet application that the second mobile wallet application may be suspicious.

20. The non-transitory machine-readable medium of claim 15, wherein the mobile wallet issuer system for the second mobile wallet application sends the session key to the second mobile wallet application.

* * * * *

UNITED STATES PATENT AND TRADEMARK OFFICE
CERTIFICATE OF CORRECTION

PATENT NO. : 11,924,186 B2
APPLICATION NO. : 18/185552
DATED : March 5, 2024
INVENTOR(S) : Hayes et al.

Page 1 of 1

It is certified that error appears in the above-identified patent and that said Letters Patent is hereby corrected as shown below:

In the Claims

In Column 20, Line 64, in Claim 16, delete "claim 5," and insert --claim 15,-- therefor Signed and Sealed this
Twenty-first Day of January, 2025

Coke Morgan Stewart
*Acting Director of the United States Patent and Trademark Office*